(12) United States Patent
Lacey et al.

(10) Patent No.: US 10,937,228 B2
(45) Date of Patent: Mar. 2, 2021

(54) POST-TESSELLATION BLENDING IN A GPU PIPELINE

(71) Applicant: Imagination Technologies Limited, Kings Langley (GB)

(72) Inventors: Peter Malcolm Lacey, Hertfordshire (GB); Simon Fenney, Hertfordshire (GB); Tobias Hector, Hertfordshire (GB); Ian King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 19 days.

(21) Appl. No.: 16/376,071

(22) Filed: Apr. 5, 2019

(65) Prior Publication Data

US 2019/0311529 A1    Oct. 10, 2019

(30) Foreign Application Priority Data

Apr. 5, 2018  (GB) ...................................... 1805656

(51) Int. Cl.

| G06T 15/50 | (2011.01) |
| G06F 9/38  | (2018.01) |
| G06T 1/20  | (2006.01) |
| G06T 15/00 | (2011.01) |
| G06T 15/80 | (2011.01) |
| G06T 17/10 | (2006.01) |
| G06T 17/20 | (2006.01) |

(52) U.S. Cl.
CPC ............ *G06T 15/503* (2013.01); *G06F 9/382* (2013.01); *G06T 1/20* (2013.01); *G06T 15/005* (2013.01); *G06T 15/80* (2013.01); *G06T 17/10* (2013.01); *G06T 17/20* (2013.01); *G06T 2200/28* (2013.01)

(58) Field of Classification Search
CPC ..... G06T 17/20; G06T 15/005; G06T 17/005; G06T 17/10; G06T 2200/28
See application file for complete search history.

(56) References Cited

U.S. PATENT DOCUMENTS

| 2011/0310102 | A1 | 12/2011 | Chang |
| 2013/0265307 | A1 | 10/2013 | Goel et al. |
| 2014/0063012 | A1 | 3/2014 | Madani et al. |
| 2014/0111513 | A1 | 4/2014 | Ceylan et al. |
| 2014/0210819 | A1 | 7/2014 | Mei et al. |
| 2016/0358373 | A1* | 12/2016 | Fenney ................ G06T 17/205 |

FOREIGN PATENT DOCUMENTS

| EP | 3 101 627 A1 | 7/2016 |
| WO | 2016/048577 A1 | 3/2016 |

* cited by examiner

*Primary Examiner* — Chong Wu
(74) *Attorney, Agent, or Firm* — Potomac Law Group, PLLC; Vincent M DeLuca

(57) ABSTRACT

Implementations of blender hardware perform both domain shading and blending and whilst some vertices may not require blending, all vertices require domain shading. The blender hardware includes a cache and/or a content addressable memory and these data structures are used to reduce duplicate domain shading operations.

20 Claims, 13 Drawing Sheets

FIG. 13A
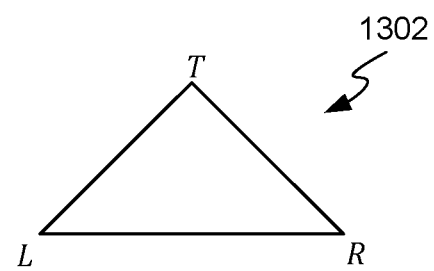
FIG. 13B
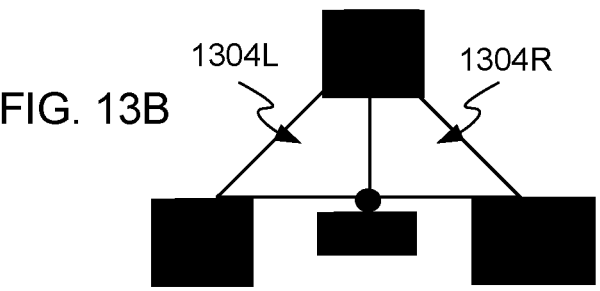
FIG. 13C
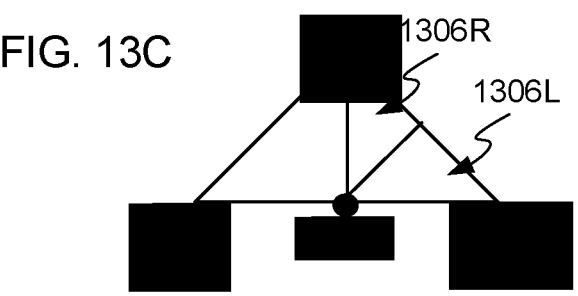
FIG. 13D
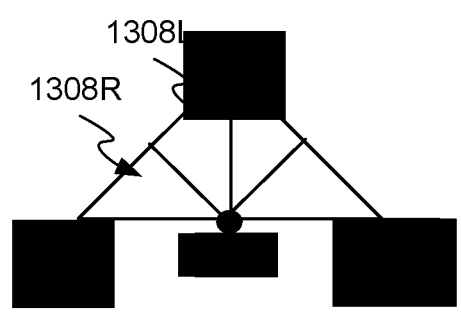
FIG. 13E
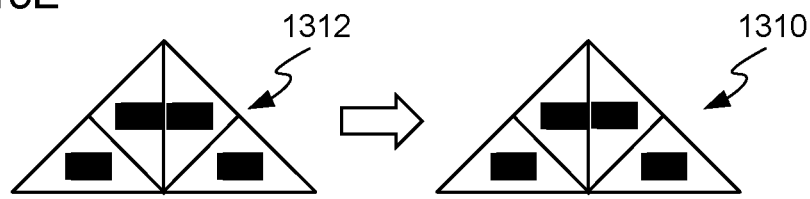
FIG. 13

POST-TESSELLATION BLENDING IN A GPU PIPELINE

BACKGROUND

Tessellation is a technique used in computer graphics to divide up a set of surfaces representing objects in a scene into a number of smaller and simpler pieces, (referred to as primitives), typically triangles, which are more amenable to rendering. The resulting tessellated surface is generally an approximation to the original surface, but the accuracy of this approximation can be improved by increasing the number of generated primitives, which in turn usually results in the primitives being smaller. The amount of tessellation/sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface patches') and/or have displacement mapping applied. The sub-division, however, is not performed on curved patches but is instead performed in the domain of the patch (e.g. as if the patch is planar rather than being defined by, for example, a polynomial equation) which may be defined in terms of (u,v) parameters and referred to as 'parametric space'. This means that the tessellation process is independent of any curvature present in the final surface.

Tessellation may be performed ahead of time (e.g. to compute a number of different views of a scene at different levels of detail and/or from different viewpoints) or may be performed on the fly (e.g. to provide continuous or view-dependent levels of detail). With some existing tessellation methods, a user can experience undesirable visual artefacts where, although the requested level of detail is changed smoothly, the resulting tessellation changes in a discontinuous fashion.

The embodiments described below are provided by way of example only and are not limiting of implementations which solve any or all of the disadvantages of known methods and apparatus for performing blending as part of (or following on from) tessellation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are a number of different implementations of blender hardware. The blender hardware performs both domain shading and blending (which is a post-process to the domain shading) and whilst some vertices may not require blending, all vertices require domain shading. The blender hardware described herein may comprise a cache and/or a content addressable memory and these data structures are used to reduce duplicate domain shading operations.

A first aspect provides a GPU pipeline comprising a tessellation unit and post-tessellation blender hardware, wherein the blender hardware comprises: an input for receiving a domain space vertex output by the tessellation unit, the domain space vertex comprising UV coordinates of the vertex, a blend weight of the vertex and where the UV coordinates of neighbour vertices are not inherent from the UV coordinates of the vertex itself, the UV coordinates of the neighbour vertices; a cache arranged to store data pairs, each data pair comprising a UV coordinate and a world space vertex generated from the UV coordinate by a domain shader; and a blend unit arranged to receive the blend weight of the input vertex, world space vertices for the input vertex and its neighbour vertices generated by a domain shader or accessed from the cache, and to generate a single world space vertex for the input vertex using the blend weight, wherein the cache is arranged to, in the event of a cache hit at a cache entry for a UV coordinate, output the world space vertex from the cache entry, and in the event of a cache miss for a UV coordinate, output the UV coordinate to a domain shader; and wherein the cache is arranged to receive and store world space vertices generated by the domain shader for input vertices and their neighbours.

A second aspect provides a method of performing post-tessellation blending comprising: receiving a domain space vertex output by the tessellation unit, the domain space vertex comprising UV coordinates of the vertex, a blend weight of the vertex and where the UV coordinates of neighbour vertices are not inherent from the UV coordinates of the vertex itself, the UV coordinates of the neighbour vertices; storing, in a cache, data pairs, each data pair comprising a UV coordinate and a world space vertex generated from the UV coordinate by a domain shader; in response to a cache hit at an entry in the cache, outputting the world space vertex from the cache entry; in response to a cache miss at an entry in the cache, outputting the UV coordinate to a domain shader and generating, in the domain shader, a world space vertex from the UV coordinate; and once world space vertices for the vertex and neighbour vertices have been output from the cache or the domain shader, generating, in a blend unit, a single world space vertex for the input vertex using the blend weight.

The method may further comprise: generating the UV coordinates of the neighbour vertices from the domain space vertex.

The method may further comprise: determining if the blend weight of an input vertex is equal to one; and in response to determining that the blend weight of an input vertex is equal to one, bypassing the blend unit and generating, in a domain shader, a world space coordinate for the input vertex from the UV coordinate of the input vertex. The method may further comprise: in response to determining that the blend weight of an input vertex is equal to one, bypassing the cache.

The method may further comprise: receiving, at the cache, world space vertices generated by the domain shader for input vertices and their neighbours. The method may further comprise: in response to receiving a world space vertex from the domain shader when all entries in the cache are full, evicting a data pair from a selected entry in the cache and storing the received world space vertex in the selected entry. The method may further comprise: selecting a cache entry for eviction based on an age of the cache entry; or selecting a cache entry for eviction based on a distance, in UV space, of the UV coordinate in the data entry and the UV coordinate corresponding to the received world space vertex.

A third aspect provides a GPU pipeline comprising a tessellation unit and post-tessellation blender hardware, wherein the blender hardware comprises: an input for receiving a domain space vertex output by the tessellation unit, the domain space vertex comprising UV coordinates of the vertex, a blend weight of the vertex and where the UV coordinates of neighbour vertices are not inherent from the UV coordinates of the vertex itself, the UV coordinates of the neighbour vertices; a content addressable memory arranged to store data tuples, each data tuple comprising a UV coordinate, a patch reference and an index; a counter arranged to be incremented when a data tuple is evicted from the content addressable memory; a blend unit arranged to receive the blend weight of the input vertex, world space vertices for the input vertex and its neighbour vertices generated in a single task by a domain shader, and to generate a single world space vertex for the input vertex; a task manager; an output index buffer; and an output vertex buffer, wherein the content addressable memory is arranged to, on receipt of an input vertex, to determine if the UV coordinate of the input vertex is stored in the content addressable memory and in response to the UV coordinate being stored in a data tuple in the content addressable memory, output the index from the data tuple to the output index buffer and in response to the UV coordinate not being stored in the content addressable memory, evict a data tuple from the content addressable memory, add the UV coordinate to a new data tuple with an index having a value equal to a value of the counter and output the index to the output index buffer and output the input vertex to the task manager, and wherein the task manager is arranged to receive input vertices from the content addressable memory, to pack UV coordinates for the input vertex and neighbour vertices of the input vertex into jobs within the same task and in response to determining that a task is full to output all the jobs in the task to the domain shader.

A fourth aspect provides a method of performing post-tessellation blending comprising: receiving a domain space vertex output by the tessellation unit, the domain space vertex comprising UV coordinates of the vertex, a blend weight of the vertex and where the UV coordinates of neighbour vertices are not inherent from the UV coordinates of the vertex itself, the UV coordinates of the neighbour vertices; storing data tuples in a content addressable memory, each data tuple comprising a UV coordinate, a patch reference and an index; on receipt of an input vertex, determining if the UV coordinate of the input vertex is stored in the content addressable memory; in response to the UV coordinate being stored in a data tuple in the content addressable memory, outputting the index from the data tuple to an output index buffer; in response to the UV coordinate not being stored in the content addressable memory: evicting a data tuple from the content addressable memory, adding the UV coordinate to a new data tuple with an index having a value equal to a value of the counter, outputting the index to the output index buffer; packing, by a task manager, UV coordinates for the input vertex and neighbour vertices of the input vertex into jobs within the same task; and in response to determining that a task is full, outputting all the jobs in the task to a domain shader and blend unit.

The method may further comprise, in the blend unit: receiving the blend weight of the input vertex, world space vertices for the input vertex and its neighbour vertices generated in a single task by a domain shader, and generating a single world space vertex for the input vertex. Generating a single world space vertex for the input vertex may comprise: generating a linear average of all input neighbour world space vertices using fixed weights; and performing a linear interpolation of the world space vertex for the input vertex itself and the world space vertex output by the linear averaging hardware logic block using the blend weight to generate a single world space vertex for the input vertex.

Packing, by a task manager, UV coordinates for the input vertex and neighbour vertices of the input vertex into jobs within the same task may comprise: placing UV coordinates for input vertices into jobs at a front end of a task; placing UV coordinates for neighbour vertices into jobs at a back end of a task; and in response to placing a UV coordinate for an input vertex into a job at the front end of a task, where the UV coordinate matches an already placed UV coordinate for a neighbour vertex, removing the job for the neighbour vertex.

The method may further comprise: generating the UV coordinates of the neighbour vertices from the domain space vertex and output the UV coordinates to the content addressable memory.

The method may further comprise: converting coordinates of the vertex from fixed-point to floating-point form prior to input to the task manager.

The method may further comprise: remapping data output by the content addressable memory data and destined for the output index buffer by using indices stored in the input index buffer to reference the indices generated by the content addressable memory.

The GPU pipeline or blender hardware may be embodied in hardware on an integrated circuit. There may be provided a method of manufacturing, at an integrated circuit manufacturing system, a GPU pipeline or blender hardware. There may be provided an integrated circuit definition dataset that, when processed in an integrated circuit manufacturing system, configures the system to manufacture a GPU pipeline or blender hardware. There may be provided a non-transitory computer readable storage medium having stored thereon a computer readable description of an integrated circuit that, when processed, causes a layout processing system to generate a circuit layout description used in an integrated circuit manufacturing system to manufacture a GPU pipeline or blender hardware.

There may be provided an integrated circuit manufacturing system comprising: a non-transitory computer readable storage medium having stored thereon a computer readable integrated circuit description that describes the GPU pipeline or blender hardware; a layout processing system configured to process the integrated circuit description so as to generate a circuit layout description of an integrated circuit embodying the GPU pipeline or blender hardware; and an integrated circuit generation system configured to manufacture the GPU pipeline or blender hardware according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 13A-13E show schematic diagrams illustrating the method of FIG. 12.

Figure 1:
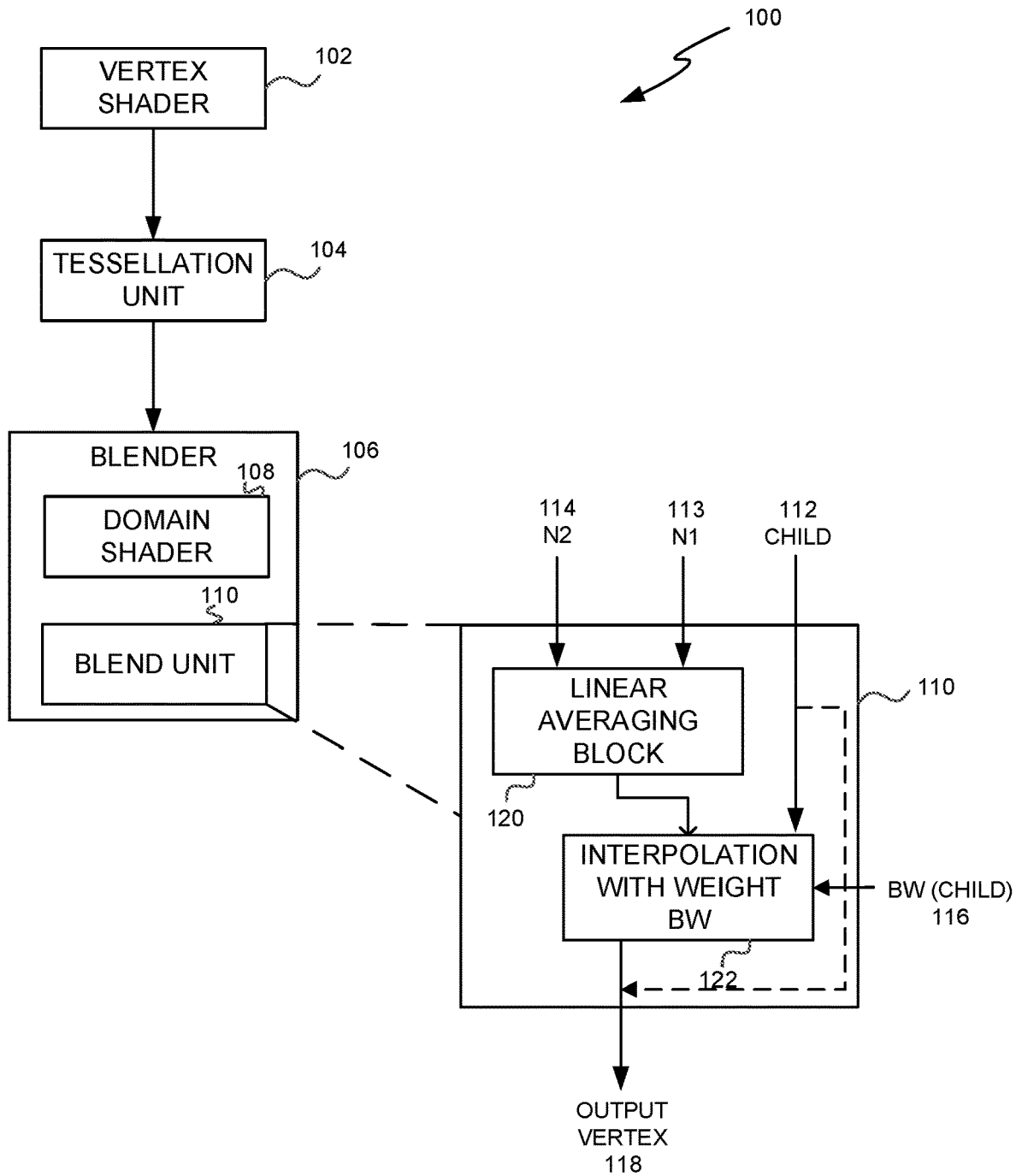
FIG. 1 shows a schematic diagram of an example graphics processing unit (GPU) pipeline which may be implemented in hardware within a GPU.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, tessellation involves the selective sub-division of patches, which are typically square or triangular in shape, into smaller triangular patches. The determination as to whether a patch should be sub-divided or not is often made based on one or more tessellation factors (TFs), e.g. by comparing one or more TFs to each other and/or to a threshold value. In some examples edge tessellation factors are used, with each edge of a patch having an edge tessellation factor, and the edge tessellation factor defining how many times the particular edge (and hence the patch which it is part of) should be sub-divided. In other examples (such as in the methods described in GB2533443 and GB2533444) vertex tessellation factors are used, with each vertex (or corner) of a patch having a vertex tessellation factor.

The term 'surface patch' is used herein to refer to a, usually finite, N-dimensional surface (or in the case of an isoline, an N-dimensional curve segment) which is the result of applying a parametric mapping function to a bounded 2D domain, which is either a quadrilateral, a triangle or any polygon, (or in the case of an isoline, a 1D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space or UV space) in which any position in the domain can be described by two coordinates (u,v) known as the domain space coordinates, which means that the tessellation process is independent of any curvature present in the final surface.

The term 'patch' is used herein to refer to an ordered set of two, three, four or more vertices (for an isoline, triangle, quad or polygon respectively) which bound a domain. The term 'domain' therefore refers to the two-dimensional space bounded by the vertices of a patch. The term 'input patch' is used to refer to a patch which is input to a tessellation unit. In examples where the tessellation unit performs a pre-processing stage which sub-divides the input patch before repeatedly applying a tessellation algorithm to patches formed by the pre-processing stage, the patches formed in the pre-processing stage are referred to herein as 'initial patches'. Patches which are formed by the sub-division of initial patches are referred to herein as 'sub-patches'. The term 'primitive' is used herein to refer to a patch (e.g. an initial patch or sub-patch) that is output by the tessellation unit because it requires no further sub-division. Whilst input, initial patches and sub-patches are often triangles and the examples below show triangles, in other examples, the input, initial patches and/or sub-patches may be isolines, quadrilaterals or any form of polygon.

The term 'vertex' is used generally to describe a location plus other attributes, where these attributes differ depending upon the context. For example, input control points and output vertices from a domain shader comprise a 3D position plus other parameters such as the normal, tangent, texture, etc. (referred to as a world space vertex), whereas the vertices within the tessellator comprise a domain space coordinate and a vertex tessellation factor (referred to as Tessellator vertices). These vertices within the tessellator are therefore not the same as the input control points or the resulting N-dimensional vertices that form the final triangles. The term 'domain vertex' is used herein to refer to the output structure of each vertex from the Tessellator, describing its state in the domain and this is the structure output to the output vertex buffer. In many examples, the domain vertex is a UV coordinate and in other examples it may additionally comprise a blend weight (BW) and optionally the UV coordinates of one or more neighbouring vertices. In particular this blend weight (BW) may be a displacement factor (DF) and these neighbouring vertices may be two or three parent vertices as described in GB2533443 and GB2533444. The displacement factor (DF) of a vertex may then be used as a weight in blending hardware which reduces the visibility of artefacts across frames in continuous levels of detail of Tessellation. Any reference to a DF in the following description is by way of example only and in other examples, the DF may be replaced by any other form of BW (e.g. a per vertex blend weight that may be applied to attributes other than the displacement of the vertex, such as normal, texture UV, colour, etc.).

In the following description, primitives, patches and sub-patches are all described as being triangular in shape, in other examples, they may be isolines or comprise more than three sides (e.g. quads or polygons with more than four sides).

Described herein are a number of different implementations of blender hardware. Blending is a post-process to any geometry subdivision of the geometry pipeline, including the Tessellator Stages or the Geometry Shader. Blending operates by mixing the attributes of a generated vertex with those of its neighbours or vertices given in its adjacency list. Blending may be used to achieve desirable visual effects such as reducing the visibility of temporal artefacts in continuous level of detail.

In most of the examples described below, the blender hardware performs both domain shading and blending and whilst some vertices may not require blending, all vertices require domain shading. It will be appreciated, however, that as blending is independent from domain shading, the domain shader may alternatively be separate from (e.g. outside of) the blender hardware. The blender hardware described herein seeks to reduce power consumption and increase throughput by reducing duplicate domain shading operations, i.e. it reduces instances in which domain shading is performed on the same vertex more than once. The blender hardware described herein may comprise a cache and/or a content addressable memory (CAM).

Whilst the methods and hardware are described herein with reference to post-tessellation domain shading, they are also applicable in other situations where there is a dependency relation (e.g. a parent-child relation as described below or other adjacency relation) between vertices that are being processed by the domain shader. For example, in other situations where sub-division occurs followed by a shading operation (e.g. where there is sub-division in a geometry shader or compute shader and blending is also applied). The methods and hardware described herein may be used where processing of vertices is performed independently except for a final cross-processing (or cross-shading) operation that involves multiple vertices as defined by the dependency relation. References to a parent-child relation below are by way of example only and may alternatively relate to any dependency (or adjacency) relation. The hardware described herein may also be used where the sub-division is performed in world space (rather than in UV space as described herein); however, in such instances, the CAM implementation described herein may not be omitted.

The blender hardware described herein may be part of a graphics processing unit (GPU) pipeline and more specifically may be part of a tessellation pipeline within a GPU pipeline.

FIG. 1 shows a schematic diagram of an example GPU pipeline 100 which may be implemented in hardware within a GPU. As shown in FIG. 1, the pipeline 100 comprises a vertex shader 102, a tessellation unit 104 and blender hardware 106. Between the vertex shader 102 and the tessellation unit (or tessellator) 104 there may be one or more optional hull shaders, not shown in FIG. 1 and the GPU pipeline may comprise other elements such as a memory, tiling units and/or other elements not shown in FIG. 1.

The vertex shader 102 is responsible for performing per-vertex calculations. It has no knowledge of the mesh topology that is being processed and performs per-vertex operations so that it only has information of the current vertex that is being processed.

Unlike the vertex shader, the tessellation unit 104 (and any optional hull shaders) operates per-patch and not per-vertex. The tessellation unit 104 outputs primitives and in systems which use vertex indexing, an output primitive takes the form of three vertex indices and a buffer of vertex data (e.g. for each vertex, a UV coordinate and in various examples, other parameters such as a displacement factor or blend weight and optionally parent or neighbour UV coordinates). Where indexing is not used, an output primitive takes the form of three domain vertices, where a domain vertex may comprise only a UV coordinate or may comprise a UV coordinate plus other parameters (e.g. a displacement factor or blend weight and optionally, parent or neighbour UV coordinates). The data output by the tessellation unit 104 may be stored in memory (not shown in FIG. 1).

As described above, tessellation, which is performed by the tessellation unit 104, involves the selective sub-division of patches, which are typically square or triangular in shape, into smaller triangular sub-patches which themselves may be further sub-divided. As described above, the patches or sub-patches output by the tessellation unit 104 are referred to as primitives. Sub-division of a patch or sub-patch typically involves sub-dividing edges of the patch or sub-patch by adding a new vertex to the edge (i.e. such that the edge is sub-divided into two shorter edges); although there may be some steps (e.g. pre-processing steps) in which a newly added vertex does not sub-divide the edge but is instead placed within the patch or sub-patch being sub-divided (e.g. at the centre of the patch). Where sub-division involves adding a new vertex to sub-divide an edge, the newly added vertex is referred to as a 'child' vertex with two 'parent' vertices which are the vertices that are connected by the edge that is being sub-divided. Where sub-division involves adding a new vertex within a patch or sub-patch, the newly added vertex is referred to as a 'child' vertex and the 'parent' vertices are the vertices of the patch or sub-patch that is being sub-divided. For example, where a triangle patch or sub-patch is being sub-divided by placing a new vertex at the centre of the patch or sub-patch, the newly added child vertex has three parent vertices. This is one way to generate suitable blend weights and neighbour relationships as input to blending. The tessellation unit 104 may implement a tessellation algorithm (or method) that ensures that parent vertices are output before their children. An example of such a tessellation method is described below with reference to FIG. 12.

The blender hardware 106 shown in FIG. 1 comprises one or more domain shaders 108 and a blend unit 110 and processes each output vertex generated by the tessellation unit 104. As described above, the blender hardware may alternatively not comprise the domain shaders and may instead work in conjunction with one or more separate domain shaders that are external to the blender hardware. The domain shader(s) 108 act as a second vertex shader for vertices produced by the tessellation unit 104. The domain shader is supplied with a domain space location (u,v) and is given patch information and outputs a full vertex structure. The domain shader uses the patch control points (from the patch information) and the domain space coordinates (UV coordinates) to build the new vertices and applies any displacement mapping (e.g. by sampling a height map encoded in a texture). The domain shading (in the domain shader 108) is left as late as possible in the GPU pipeline 100 because it greatly enlarges vertex sizes (i.e. it increases the size of memory required to store each vertex).

The blend unit 110 takes as inputs the vertex data output from the domain shader(s) 108 for all child vertices or alternatively for each child vertex 112 that does not have a BW (e.g. DF) equal to one. For each child vertex 112 that is input and has a blend weight that is not equal to one, the blend unit 110 also takes as input the vertex data output from the domain shader(s) 108 for the neighbour (e.g. parent) vertices, N1 113 and N2 114, along with the BW (e.g. DF) 116 for the child vertex and blends the child and neighbour vertex attributes (with each attribute being blended separately) to generate a single output vertex 118 corresponding to each input child vertex 112. As each neighbour vertex may also be a child vertex of its neighbour vertices and two child vertices may share a common neighbour vertex, without the optimizations described herein, the same vertex may be processed by the domain shader(s) 108 more than once. Such duplication reduces the throughput of the blender hardware 106 and increases its power consumption.

An example implementation of the blend unit 110 is also shown in FIG. 1 and in this implementation the blend unit 110 comprises a linear averaging hardware logic block 120 and a hardware interpolation unit 122. Both of these blocks 120, 122 perform linear interpolation; however the linear averaging block may take more than two inputs and has a fixed, equal weight for all inputs. The linear averaging hardware logic block 120 performs an averaging operation on all input vertices where this may, for example, comprise generating a linear average of all input vertices, irrespective of how many there are. In other examples and where the vertex's neighbours are the corners of a domain, the linear averaging hardware logic block 120 may perform an averaging (or interpolation) operation that is weighted by the barycentric coordinates of the vertex inside the domain. In the example shown in FIG. 1, there are two input vertices, the neighbour vertices 113, 114 and the linear averaging hardware logic block 120 creates a linear average of these two neighbour vertices. There may be some vertices which are special cases and have neighbour information hard coded in the system and these may be supplied as input to the blending operation (and in particular to the linear averaging hardware logic block 120) when those particular vertices are processed. The hardware linear interpolation unit 122 interpolates the output from the linear averaging hardware logic block 120 and the child vertex 112 with a weight which is the BW (e.g. DF) 116 for the child vertex, output by the Tessellator.

In examples where all child vertices are input to the blend unit 100, those child vertices with a BW of one bypass both the averaging block 120 and the interpolation stage 122 within the blend unit 110 (as indicated by the dotted arrow).

Although not shown in FIG. 1, the BW (e.g. DF) that is input to the blend unit 110 may be converted from fixed-point format to floating-point format prior to being used as a weight in the interpolation unit 122.

Although the blend unit 110 in FIG. 1 is shown as comprising a linear averaging hardware logic block 120 and a hardware linear interpolation unit 122, in other examples, the interpolation may not be a fixed function but may instead be performed using a shader (e.g. such that there is a further shader in the blend unit 110 or such that the blend unit 110 is part of the domain shader 108). For example, the blend operation may be performed as a final step of the domain shade of a vertex, whereby the neighbour information (e.g. the parent vertices) are derived from the vertex and shaded as sub-processes of the shader. Additionally if the Tessellation is performed after projection then rather than a linear interpolation, projective correct interpolation may be used instead.

In examples where the GPU pipeline 100 uses a tile-based rendering approach, the GPU pipeline 100 may additionally comprise a tiling unit (not shown in FIG. 1) that is logically positioned after the blender hardware 106. In such examples the domain shader 108 within the blender hardware 106 may be modified so that it outputs a positional attribute only and omits (or bypasses) operations to generate other parameters such as texture coordinates, normal, etc. The tiling unit reads the data generated by the tessellation unit 104 (which, as described above, may be stored in memory) and generates per-tile display lists. Each per-tile display list identifies, for a particular tile, those primitives which are at least partially located within that tile. These display lists may be generated by the tiling unit using a tiling algorithm and may be written to memory and read by subsequent elements in the GPU pipeline 100. This enables the subsequent elements to perform rendering operations (or other operations) on a tile by tile basis and this may, for example, improve efficiency.

Figure 2:
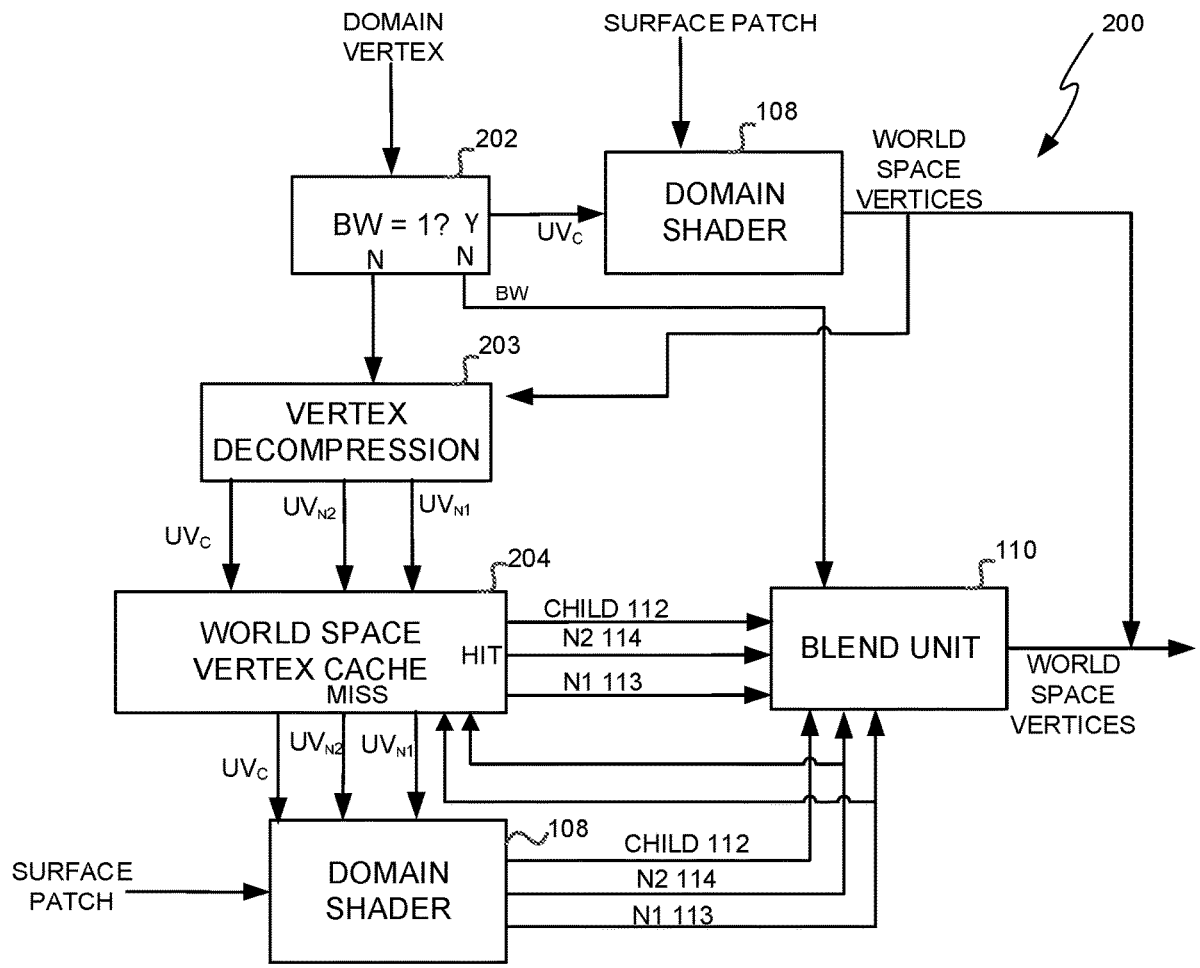
FIG. 2 shows a schematic diagram of a first example blender hardware in more detail.
Figure 3:
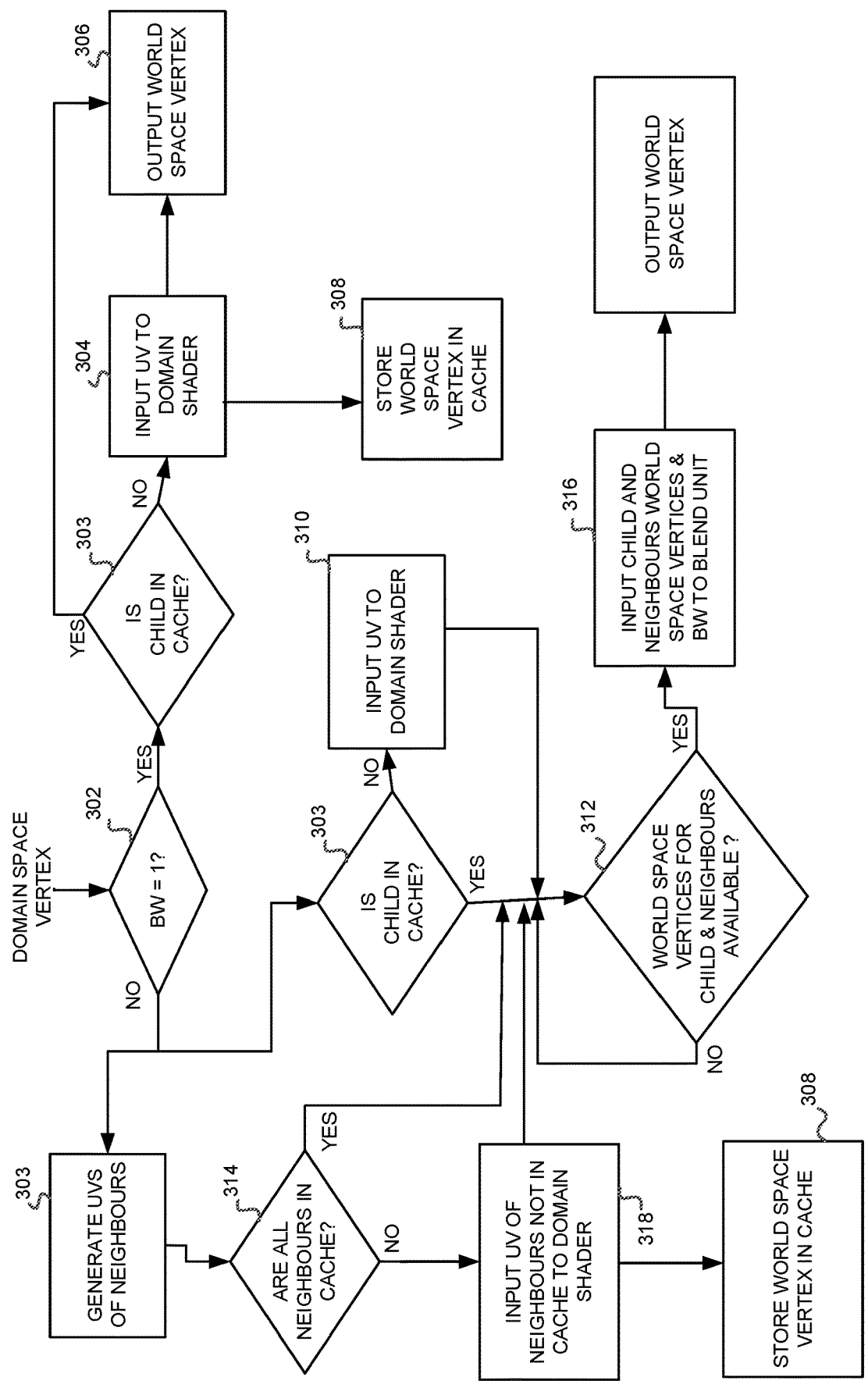
FIG. 3 is a flow diagram showing the operation of the blender hardware of FIG. 2.

FIG. 2 shows a schematic diagram of a first example blender hardware 200 in more detail that may be implemented as the blender hardware 106 in the GPU pipeline 100 shown in FIG. 1. FIG. 3 is a flow diagram showing the operation of the blender hardware 200. As shown in FIG. 2, the blender hardware 200 receives as an input a domain space vertex generated by the tessellation unit 104 and information on the surface patch (e.g. control points of the patch comprising n vertices output from the vertex shader, as well as the value of n) which bypasses the tessellation unit 104 and hence may be received from the vertex shader 102. The control points of the surface patch describe the behaviour of the surface that the tessellated vertices are attempting to approximate. A domain space vertex comprises the UV coordinates of the vertex itself, the UV coordinates of its neighbour (e.g. parent) vertices and the vertex's BW (e.g. the vertex's DF). The domain space vertex output by the Tessellator may not comprise the UV coordinates of its neighbour vertices and instead these may be inherent from the UV coordinate of the vertex itself. In this case a vertex decompression stage may be included as part of the blending unit in order to generate the extra coordinates. Additionally, where the number of neighbour vertices is not fixed (e.g. at two), the domain space vertex may also specify the number of neighbour vertices.

The blender hardware 200 shown in FIG. 2 comprises one or more domain shaders 108 and a blend unit 110, as described above with reference to FIG. 1. Although two domain shaders 108 are shown in FIG. 2, this is by way of example only and there may, in other examples, be one domain shader or one block of domain shaders or alternatively the domain shaders may be external to the blender hardware 200. The blender hardware 200 further comprises an optional blend weight assessment logic block 202, a vertex decompression logic block 203 and a cache for world space vertices 204 (i.e. vertices output by the domain shaders 108). In other examples, the BW assessment logic block 202 may be omitted and all vertices may be processed in the same way irrespective of their BW value. The blender hardware 200 may additionally comprise other elements not shown in FIG. 2, such as elements that convert coordinates (e.g. U and V coordinates) from a fixed-point integer (e.g. a value between 0 and 64 or 192) to a floating point value (e.g. in the range [0,1]) in examples where the tessellation unit 104 outputs a fixed point value, in order that the domain shaders 108 receive inputs in floating point format.

As described above, the domain space vertex that is received as an input comprises the UV coordinates of the vertex itself, the vertex's BW (e.g. the vertex's DF) and, unless the UV coordinates are inherent from the UV coordinates of the vertex itself, the UV coordinates of its neighbour (e.g. parent) vertices. The vertex decompression logic block 203 comprises hardware logic arranged to convert the domain space vertex (which is output from the tessellation unit 104) into multiple domain space coordinates, for the child vertex and its neighbours.

The cache for world space vertices 204 is arranged to store a number of (UV coordinate, world space vertex) pairs, with the UV coordinate being used to address the cache entries. In various examples, the cache 204 may be arranged to store 16 data pairs or more than 16 data pairs (e.g. 32 data pairs). For known tessellation schemes even a small cache (e.g. 4 data pairs) yields a large reduction in the number of duplicate domain shader calls and if the cache is arranged to store 16 or more data pairs, the amount of excess domain shader processing may be reduced by over 90% in the worst case and on average by 95% for spatially coherent geometry, such that there are 1.05-1.10 domain shader calls per vertex instead of one plus the average number of neighbouring vertices, typically no less than 2 in total (where the cache is omitted). By increasing the size of the cache the chance of a cache miss (which may result in a duplicate domain shader call) is reduced; however, as the size of the cache increases, the time taken to perform a cache look-up is also increased and the improvement that is achieved, in terms of a reduction in duplicate domain shader calls, does not increase linearly. In various examples, the entries in the cache may be sorted by the UV coordinates to increase the speed of cache look-ups.

The cache 204 may operate a replacement policy of FIFO (first-in-first-out) such that once the cache is full, the oldest entry in the cache is ejected when there is a new world space vertex that needs to be stored (in block 308). In other examples, the cache may instead select a data pair for ejection based on the UV coordinates of the new vertex to be added to the cache. For example, the data pair that is selected for ejection may be the data pair with a UV coordinate which is furthest away in UV space from the UV coordinate in the new data pair that is to be stored in its place. By using a replacement policy that ejects the data pair for a vertex that is furthest away in UV space, the number of domain shader calls (which are a consequence of a cache miss) can be significantly reduced (e.g. halved). This can be further reduced if the tessellation unit 104 implements a tessellation algorithm (or method) that produces primitives more coherently in UV space, such as alternating subdivision of left and right sub-patches in a known binary subdivision tessellation scheme. An example of such an improved tessellation method is described below with reference to FIG. 12. This further reduction in the number of domain shader calls is achieved because this triangle ordering reduces the distance (in UV space) between adjacent triangle patches and hence vertices that are input to the blender hardware 200 are nearer to their neighbouring vertices in the output order.

Within the blender hardware 200 shown in FIG. 2, the blend weight is assessed (block 302) in the optional BW assessment logic block 202. This logic block 202 comprises hardware logic arranged to check whether the vertex's blend weight is equal to one. A blend weight that is equal to one indicates that the vertex is in its final state and is not affected by its neighbours, and hence blending (in the blend unit 110) is redundant and so not required. As many vertices that are input to the blender hardware 200 (e.g. approximately one half of displacement factors in certain tessellation schemes) will have a blend weight equal to one, by filtering these out early and bypassing the blend unit 110 for these vertices, the overall amount of processing that is performed by the blender hardware 200 is significantly reduced and so the power consumption is similarly significantly reduced.

If a vertex has a blend weight equal to one ('Yes' in block 302), a check is performed to determine whether the world space vertex is stored in the cache 204 (block 303). If the world space vertex is not in the cache ('No' in block 303), the UV coordinates of the vertex (denoted $UV_C$ in FIG. 2) are input to the domain shader 108 (block 304) and the domain shader 108 generates a world space vertex from the input UV coordinates and the surface patch information. If the world space vertex is in the cache ('Yes' in block 303), the domain shader 108 is bypassed. The world space vertex, which is either generated by the domain shader or accessed from the cache, is then output from the blender hardware 200 (block 306) and if the world space vertex wasn't already stored in the cache for world space vertices 204, it is added into the cache (block 308).

If it is determined (in the blend weight assessment logic block 202) that the vertex's blend weight is not equal to one ('No' in block 302), a check is performed to determine whether the world space vertex is stored in the cache 204 (block 303). If the world space vertex is not in the cache ('No' in block 303), the UV coordinates of the vertex, $UV_C$, are input to the domain shader 108 (block 310) and as described above, the domain shader 108 generates a world space vertex. If the world space vertex is in the cache ('Yes' in block 303), the domain shader 108 is bypassed. Even once the world space vertex has been obtained (e.g. generated in the domain shader 108 or accessed from the cache 204) blending cannot occur until the world space vertices for the neighbour vertices are also available ('Yes' in block 312). As well as outputting the UV coordinates of the vertex, $UV_C$, the blend weight assessment logic block 202 also outputs input domain space vertex to the vertex decompression block 203 which generates the UV coordinates of the neighbour vertices, denoted $UV_{N1}$ and $UV_{N2}$ in FIG. 2 (block 303). As described above, these UV coordinates are used to address the cache 204 and hence to determine whether either or both of the world space vertices for the neighbour vertices are stored in the cache (block 314). If both world space vertices for the neighbour vertices are in the cache ('Yes' in block 314), then these values, denoted N1 and N2 in FIG. 2, along with the world space vertex for the vertex and the vertex's blend weight are input to the blend unit 110 (block 316). If, however, either or both of the world space vertices for the neighbour vertices are not in the cache ('No' in block 314, i.e. resulting in at least one cache miss), then the UV coordinates of the missing vertices are input to the domain shader 108 (block 318). As described above, the domain shader 108 generates a world space vertex from the input UV coordinates (e.g. $UV_{N1}$ or $UV_{N2}$) and the surface patch information. The generated world space vertices for the missing neighbours are stored in the cache 204 (block 308).

Once the world space vertices for the input (child) vertex and the neighbour vertices are available ('Yes' in block 312), then these world space vertices are input to the blend unit 110 (block 316). The operation and structure of the blend unit 110 may be as described above with reference to FIG. 1. The output from the blend unit 110, which is a blended world space vertex, is then output from the blender hardware 200 (block 320).

Where both neighbour UV coordinates along with the corresponding world space vertices are already stored in the cache 204 ('Yes' in block 314), the latency is minimised because blending (in blend unit 110) can occur as soon as the domain shader has processed the input vertex's UV coordinates to generate the corresponding world space vertex. Where neither neighbour UV coordinate is found in the cache 204, the latency can be reduced by running three domain shaders in parallel (one for each neighbour and one for the vertex itself); however the latency may be increased (e.g. to the maximum time taken to process any of the three vertices) and additional power is required compared to where a cache is used. Hence the use of a cache, as described above, reduces both latency and power consumption.

As described above, where world space vertices are generated (in the domain shader 108) for neighbour vertices (in block 318) or an input vertex with a blend weight equal to one (in block 304), then the world space vertices are stored in the cache 204 (block 308). However, the world space vertex for an input vertex with a blend weight that is not equal to one (and hence is less than one as the blend weight is between 0 and 1 inclusive) need not be stored in the cache because such vertices cannot be parents as they are not yet in their final position.

As shown in FIG. 3, a cache look-up is performed (in block 303) prior to domain shading. However, where a tessellation method is used that guarantees to output neighbour vertices before their children (e.g. the method described below with reference to FIG. 12, these cache look-ups (i.e. block 303 in FIG. 3) may be omitted and the UV coordinate of the vertex may be passed directly to a domain shader 108.

Figure 4:
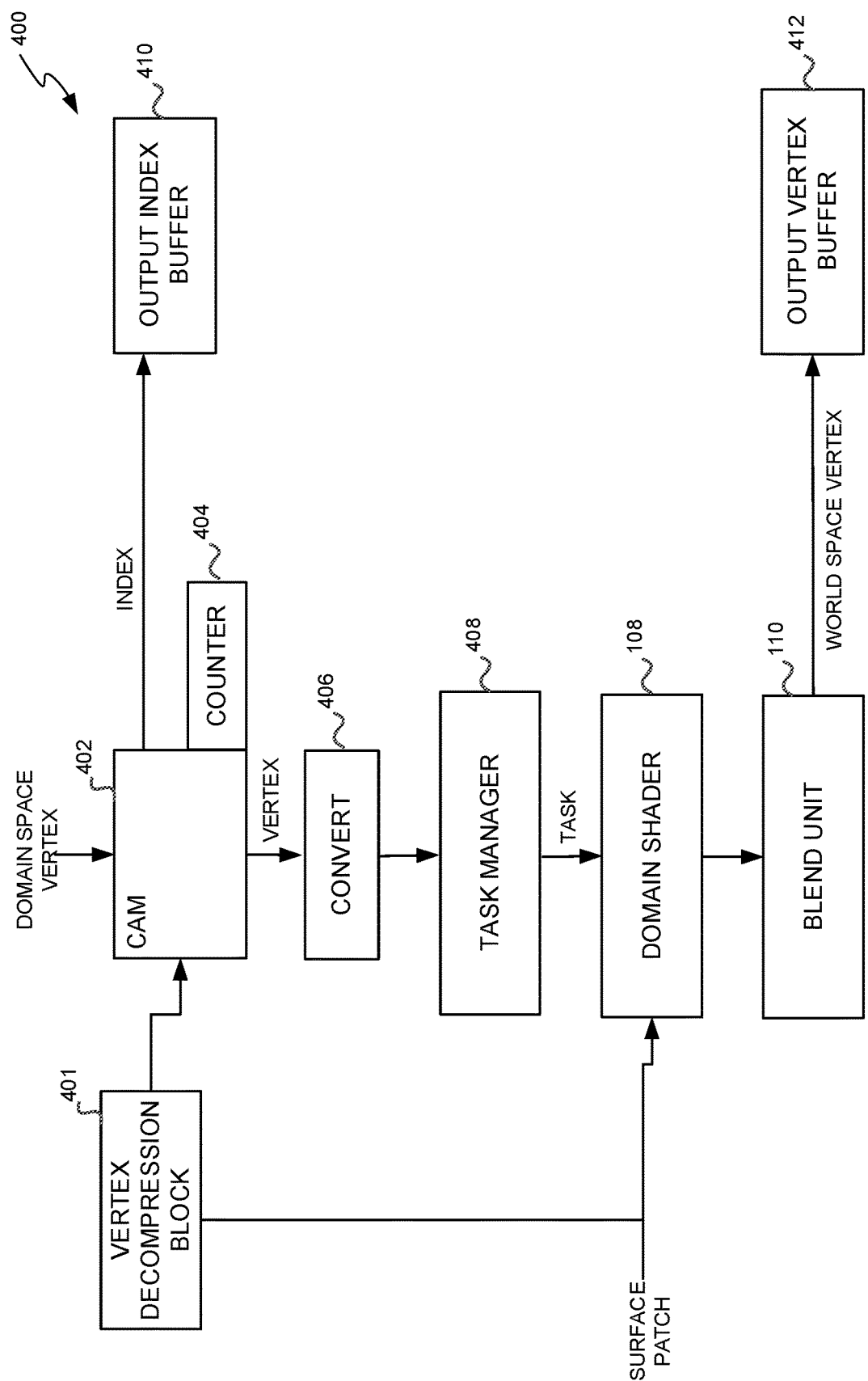
FIG. 4 shows a schematic diagram of a second example blender hardware in more detail.

FIG. 4 shows a schematic diagram of a second example blender hardware 400 in more detail that may be implemented as the blender hardware 108 in the GPU pipeline 100 shown in FIG. 1. As shown in FIG. 4, the blender hardware 400 receives as inputs the domain space vertices generated by the tessellation unit 104 and information relating to the surface patch which bypasses the tessellation unit 104 and hence may be received from the vertex shader 102. The domain space vertex comprises the UV coordinate of the vertex and the vertex's blend weight and may also comprise the UV coordinates of the neighbour vertices (e.g. parent vertices) where these are not inherent from the UV coordinate of the vertex itself and the number of neighbour vertices where this is not a fixed number.

Figure 5:
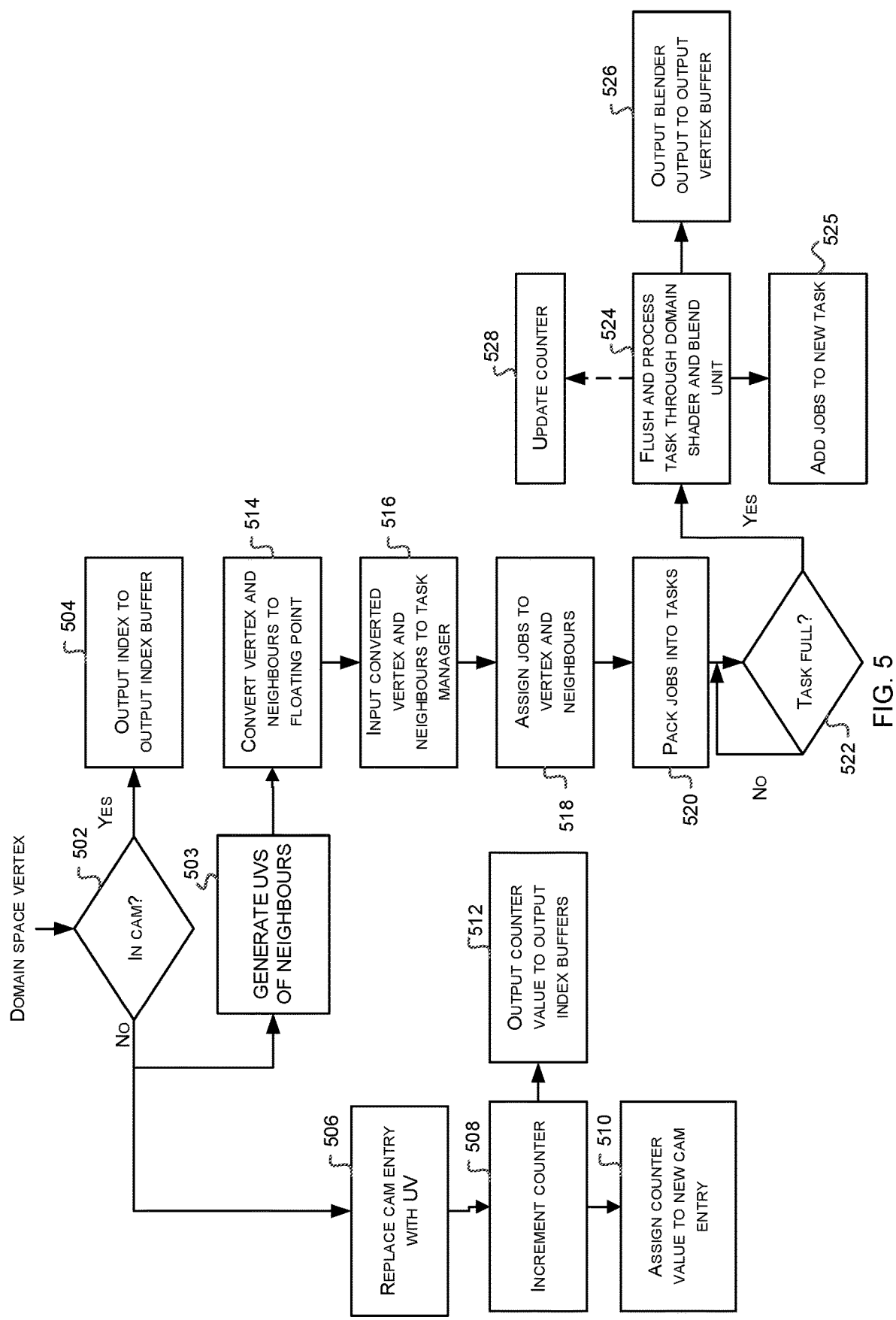
FIG. 5 is a flow diagram showing the operation of the blender hardware of FIG. 4 or 7.
Figure 6:
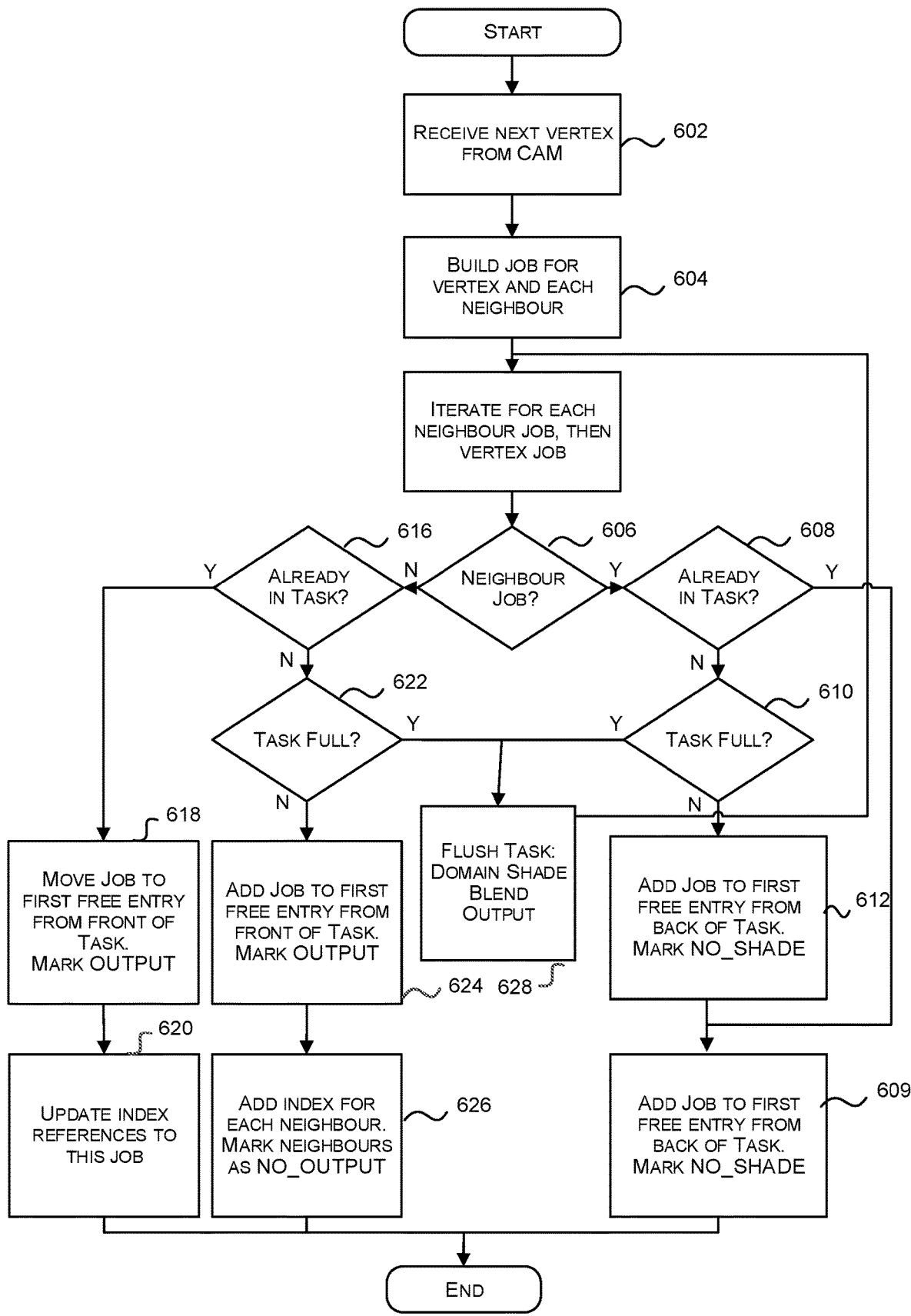
FIG. 6 is a flow diagram showing the operation of the task manager in the blender hardware of FIG. 4 or 7.

The blender hardware 400 shown in FIG. 4 comprises one or more domain shaders 108 and a blend unit 110 as described above with reference to FIG. 1. As noted above, in variations on this blender hardware 400, the domain shaders 108 may be external to the blender hardware 400. FIGS. 5 and 6 are flow diagrams showing the operation of the blender hardware 400. The blender hardware 400 further comprises a vertex decompression block 401, a content addressable memory (CAM) 402 that comprises (or has associated with it) a counter 404, a conversion logic block 406, a task manager 408, an output index buffer 410 and an output vertex buffer 412. The blender hardware 400 may additionally comprise other elements not shown in FIG. 4, e.g. a second smaller CAM or other data structure.

The vertex decompression block 401 (like the vertex decompression block 203 shown in FIG. 2) comprises hardware logic arranged to convert the domain space vertex (which is output from the tessellation unit 104) into multiple domain space coordinates, for the child vertex and its neighbours.

The CAM 402 is provided in order to stitch together equivalent vertices (i.e. vertices with the same UV coordinate and same blend weight, although one may be child vertex and the other a neighbour vertex with an implicit blend weight of 1) and is arranged to store a number of (UV coordinate, patch reference, index) tuples (e.g. 32, 64 or 128 data tuples). The CAM 402 may store both parent and neighbour vertices or, where the tessellation method guarantees that neighbour vertices are output before their children, the CAM 402 may only store child vertices. The task manager 408 assembles vertices into tasks that are then processed by the domain shader 108 and blend unit 110. The term 'job' is used herein to refer to a single instruction for execution of a shader and the term 'task' is used herein to refer to a set of jobs (e.g. 32, 64, 128, etc. jobs) to be processed together. Each task therefore comprises a plurality of vertices and all the vertices within a task are processed in parallel so that the world space vertices for all vertices in a task are available for use by the blend unit 110 when processing vertices in that task. The task manager 408 therefore minimises duplicate work by efficient packing of vertices into tasks, i.e. by ensuring that where a vertex is not found to be stored in the CAM, the vertex and its neighbour vertices are added to the same task (with the vertex job having indices associated with it to indicate which vertices in the task are its neighbours). This means that the domain shader results for the vertex and its neighbours are all available at the same time for input to the blend unit 110. In the blender hardware 400, all geometry after the CAM stage is indexed (e.g. for primitive assembly before rasterization or the geometry shader stage).

As shown in FIG. 4, the CAM 402 receives as input domain space vertices generated by the tessellation unit 104 and a reference to the current patch (e.g. a patch index, which is part of the surface patch information input to the blender hardware 400). Each input domain space vertex is checked against the current CAM entries, which as described above comprise (UV coordinate, patch reference, index) tuples (block 502). The patch reference that is stored in a CAM entry may, for example, be an index to a list of patches and as a memory optimisation, the patch reference stored in the CAM may be a shorter, local patch index which references a look-up table from which the longer patch reference may be obtained. If a match is found for both the UV and the patch reference ('Yes' in block 502), the corresponding entry index is passed out to the output index buffer 410 (block 504). If a match is not found ('No' in block 502), an entry in the CAM 402 is replaced by the new vertex UV (block 506), the counter 404 is incremented (block 508) and the new counter value is assigned to the new CAM entry (block 510) as well as being passed on to the output index buffer 410 (block 512). The entry that is replaced (in block 506) may, for example be the oldest entry in the CAM or alternatively a different replacement scheme may be used, e.g. with the entry that is furthest away in UV space being replaced. Additionally, if a match is not found ('No' in block 502), the UVs of the neighbours are generated (block 503). If the domain vertices have fixed point coordinates, the coordinates of the vertex and its neighbours are converted from fixed-point form to floating-point form (block 514, in the converter logic block 406) and then passed to the task manager 408 (block 516). This ensures that the coordinate is in floating-point form before being input to the domain shader 108.

The task manager 408 is arranged to assign a task job to each received vertex and to each neighbour of the new vertex (block 518). These jobs are then packed into a task (block 520) and in various examples an additional small CAM or other data structure (not shown in FIG. 4) may be used to store details of which vertices are already in the task and hence to check whether a vertex (in the form of its UV coordinate) has already been added to the task. This small CAM or data structure may, for example, store (UV, task index) data pairs. When duplicate UVs are added to the task (either as a vertex or one of its neighbours) only one job is processed for the vertex so that duplicate work is not performed. To ensure that only one job is processed for the vertex, the jobs in the task are condensed and this is performed in such a way that the order of vertices output from the blender hardware 400 matches the order the vertices are submitted to the task (in block 516). To achieve this, the child vertex jobs occupy contiguous entries from the front of the task, ensuring all indices are correct and neighbour only jobs occupy entries at the end of the task, such that the resultant task comprises jobs organised as follows by the task manager:

[child only or child & neighbour jobs|empty jobs|neighbour only jobs]

This may be achieved (in block 520) by the task manager placing child jobs on the left in turn and all neighbour jobs on the right (when defined logically). If a new child job is entered that matches a neighbour job then the new job is placed at the end of the left group and the neighbour job on the right is removed. In order to use space efficiently, when a neighbour job on the right is removed, all neighbour jobs to its left may be shifted one job to the right to remove the gap or the leftmost neighbour job may be moved into the empty slot instead.

If at any stage the new vertex (including all of its neighbours) cannot fit into the task ('Yes' in block 522), all the jobs are flushed and processed (block 524) and the vertex is added to the next task (block 525). This implies that the task size should be at least n+1 (when the maximum number of neighbours is n) so that every vertex and its neighbours can be processed as jobs in a single task; however larger tasks (e.g. comprising 32 or 64 jobs) provide greater efficiency. Having processed the task, the output from the blend unit 110 is input into the output vertex buffer 412 (block 526). An example method of operation of the task manager 408 is described in more detail below with reference to the flow diagram in FIG. 6.

The operation of the domain shader 108 and blend unit 110 may be fixed function or may use programmable shader code. Although the domain shader 108 and blend unit 110 are shown as separate elements in FIG. 4 (and also in FIGS. 1 and 2), the processing may be done locally or passed to a different unit for execution (such as to a unified shader core, USC, within the GPU).

As shown in FIG. 5, in various examples the counter 404 is updated (in block 528) when jobs are flushed (in block 524). For example, if the system requires that all vertices processed in the task are output (even if they are not referenced by the Output Index Buffer 410) then the counter 404 is increased (in block 528) to the next multiple of the task size each time a task is processed so that the indices are correct. This increase may be communicated to the CAM 402 using a Task Flush Signal generated by the task manager 408. In various examples, in order to reduce the maximum size of the counter 404 of the CAM 402 when processing multiple patches and therefore reduce the size of indices in CAM entries, the counter 404 may be reset for each patch and an index offset accumulated—the indices can then be offset by this value before being emitted from the CAM.

FIG. 6 is a flow diagram showing an example method of operation of the task manager 408 in more detail. The operations shown in FIG. 6 correspond to blocks 518-526 in FIG. 5. As shown in FIG. 6, the task manager receives a vertex from the CAM 402 via the converter hardware 406 (block 602) and builds one or more jobs for the vertex and each of its neighbours, consisting of a UV coordinate and a Patch Reference, (block 604). The task manager 408 processes each neighbour in turn before processing the vertex (block 606) in order to generate the neighbour task indices first, followed by the vertex itself. Furthermore, as described below, the vertex itself is treated differently to its neighbours. Each job assigned by the task manager 408 has one of three states determining how much processing the vertex requires and these are: NO_SHADE, NO_OUTPUT and OUTPUT. The details of these job states are described below.

As shown in FIG. 6, neighbour jobs ('Yes' in block 606) are checked against the current Task Entries (block 608), i.e. against all the jobs already added to the current task. If a match is found ('Yes' in block 608) the index of that job is returned (block 609). If not, ('No' in block 608) and the task is not full ('No' in block 610), the job is added to the first available entry from the back end of the Task, is marked NO_SHADE (block 612), and the index of this job is returned (block 609).

The job for the vertex itself is also checked against the current Task Entries (block 616). If a match is found ('Yes' in block 616) the current job entry, which will be a neighbour job (marked NO_OUTPUT, from a previous instance of block 626), is moved to the first available entry from the front of the Task, is changed to OUTPUT (block 618), and all index references to the found entry are replaced by the new entry index (block 620). If, however, no match is found ('No' in block 616), and the task is not full ('No' in block 622), the job is added to the first available entry from the front of the Task and is marked OUTPUT (block 624). It is then assigned its neighbour indices and the jobs referenced by these indices are updated from NO_SHADE to NO_OUTPUT (block 626).

In order to update index references at the point of change (in block 626) the Task Manager 408 can either iterate through all the tasks looking for any instance of the old index or, if back references are added (where a back reference is a reference in a neighbour vertex job to the tasks that depend upon them), it can go directly to the outdated entries.

The assumption that a duplicate UV found in the Task must be a neighbour job can be made if and only if the size of the CAM is greater than or equal to the number of job entries, as any sequence of this many vertices submitted to the Task Manager will have any duplicates merged by the CAM. An alternative way for the task manager to operate is for each vertex to be added to the task in turn (without adding neighbour jobs), then once the task is sufficiently full a second pass of the task is made to add indices to each vertex with neighbours corresponding to the jobs of these neighbours. If a neighbour is not found it is simply added to the end of the task and marked as NO_OUTPUT rather than OUTPUT. However in this scheme a sufficient number of job slots must be reserved at the end of the task in order to fit in these extra neighbours.

If at any point the Task is full ('Yes' in block 610 or block 622), i.e. all entries are occupied by jobs, the Task is flushed (block 628), thereby freeing up all the entries for subsequent vertices, and the flushed jobs are dispatched to the domain shader 108 and blend unit 110 (which as described above may be implemented as a shader processor, e.g. a USC, that is configured to perform both domain shading and blending). Once processing has finished the results corresponding to OUTPUT jobs are passed (in their Task entry order) to the Output Vertex Buffer 412 or, in systems where feedback is supplied by the task manager 408 to the CAM 402, the results of every job are passed to the Output Vertex Buffer 412.

Figure 7:
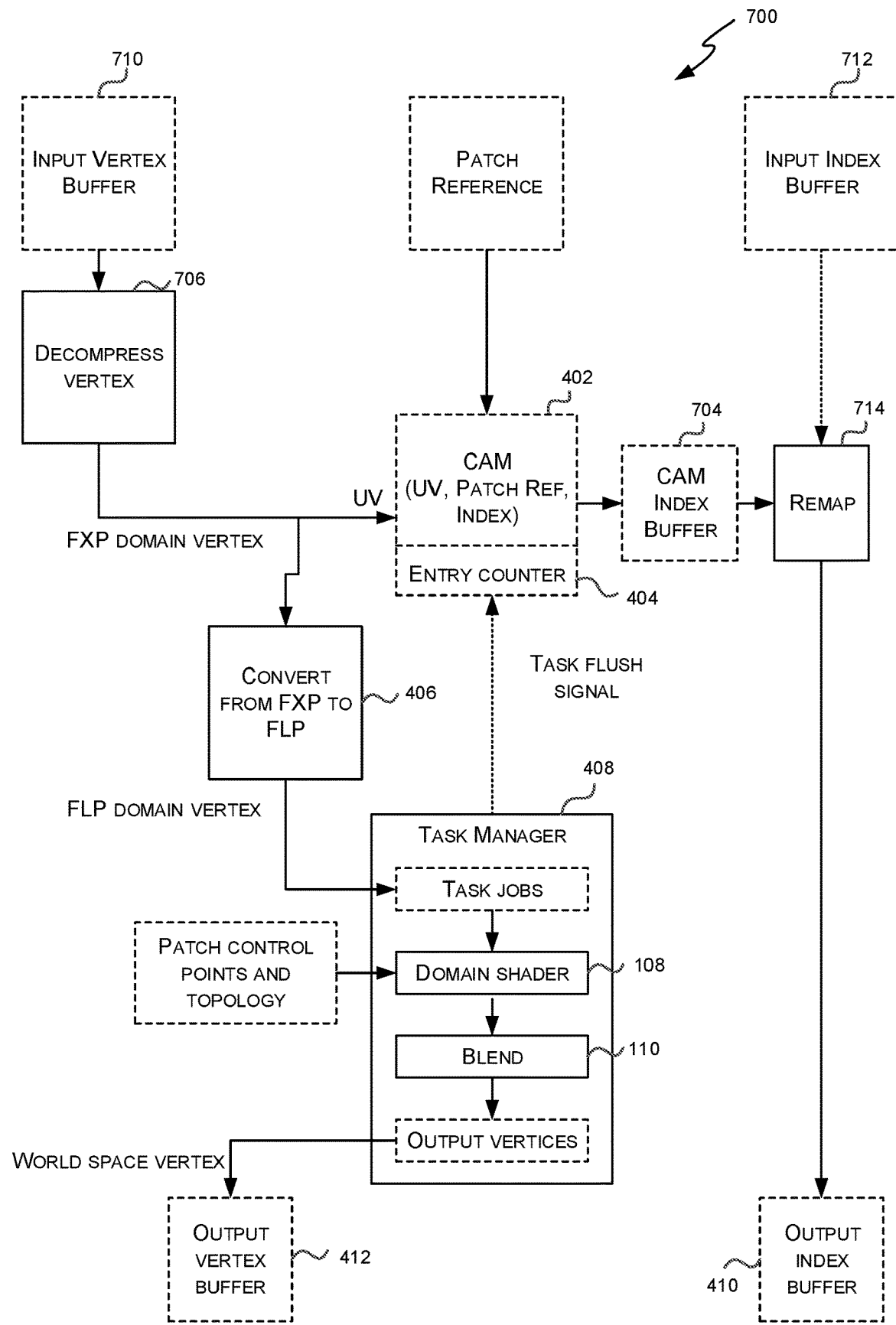
FIG. 7 shows a schematic diagram of a third example blender hardware in more detail.

FIG. 7 shows a schematic diagram of a third example blender hardware 700 in more detail that may be implemented as the blender hardware 108 in the GPU pipeline 100 shown in FIG. 1. The third example blender hardware 700 is very similar to that shown in FIG. 4 and described above; however, the blender hardware shown in FIG. 7 is configured for use when the geometry output by the tessellation unit 104 is indexed. Consequently, the blender hardware 700 comprises two additional elements: a CAM index buffer 704 and a remapping logic block 714.

If the vertices output by the tessellation unit 104 are compressed, the blender hardware 700 (like the blender hardware 400) may comprise hardware logic elements arranged to decompress vertices 706 prior to passing them (in their decompressed form) to the CAM 402 (e.g. a vertex decompression block 203 as shown in FIG. 2 and described above). The blender hardware 700 (and similarly the blender hardware 400) may also comprise one or more input buffers 710, 712.

The blender hardware 700 operates as described above with reference to FIGS. 5 and 6 with the addition that the CAM 402 outputs indices to the CAM index buffer 704 instead of directly to the output index buffer 410 and the remapping logic block 714 is arranged to assemble the final data that is input to the Output Index Buffer 410 by using the indices stored in the Input Index Buffer 712 to reference the new indices (as generated by the CAM 402 based on values of the counter 404) stored in the CAM Index Buffer 704.

As described above with reference to FIGS. 5 and 6, when the Task is full ('Yes' in any of blocks 522, 610 and 622), the contents are processed with fixed function and/or shader programmable code in the domain shader 108 (blocks 524 and 628). When using tessellation schemes producing vertices with neighbour information, the blend unit 110 may be used to mix attributes between domain shader results of the vertex and domain shader results of its neighbours. This may occur in the same shader core as the domain shader as the neighbours are packed into the same task as their children.

The responsibility of the task manager 408 (in blender hardware 400, 700) is to ensure all neighbours are assigned jobs in the task and that all references to these task indices are properly generated. Additionally, the Task Manager 408 is responsible for setting the correct state for each job as follows:

| OUTPUT | Jobs corresponding to vertices sent from the CAM |
| NO_OUTPUT | Jobs corresponding to neighbours of vertices whose jobs are in the CAM |
| NO_SHADE | Jobs corresponding to neighbours of vertices whose jobs are not in the CAM |

Figure 8:
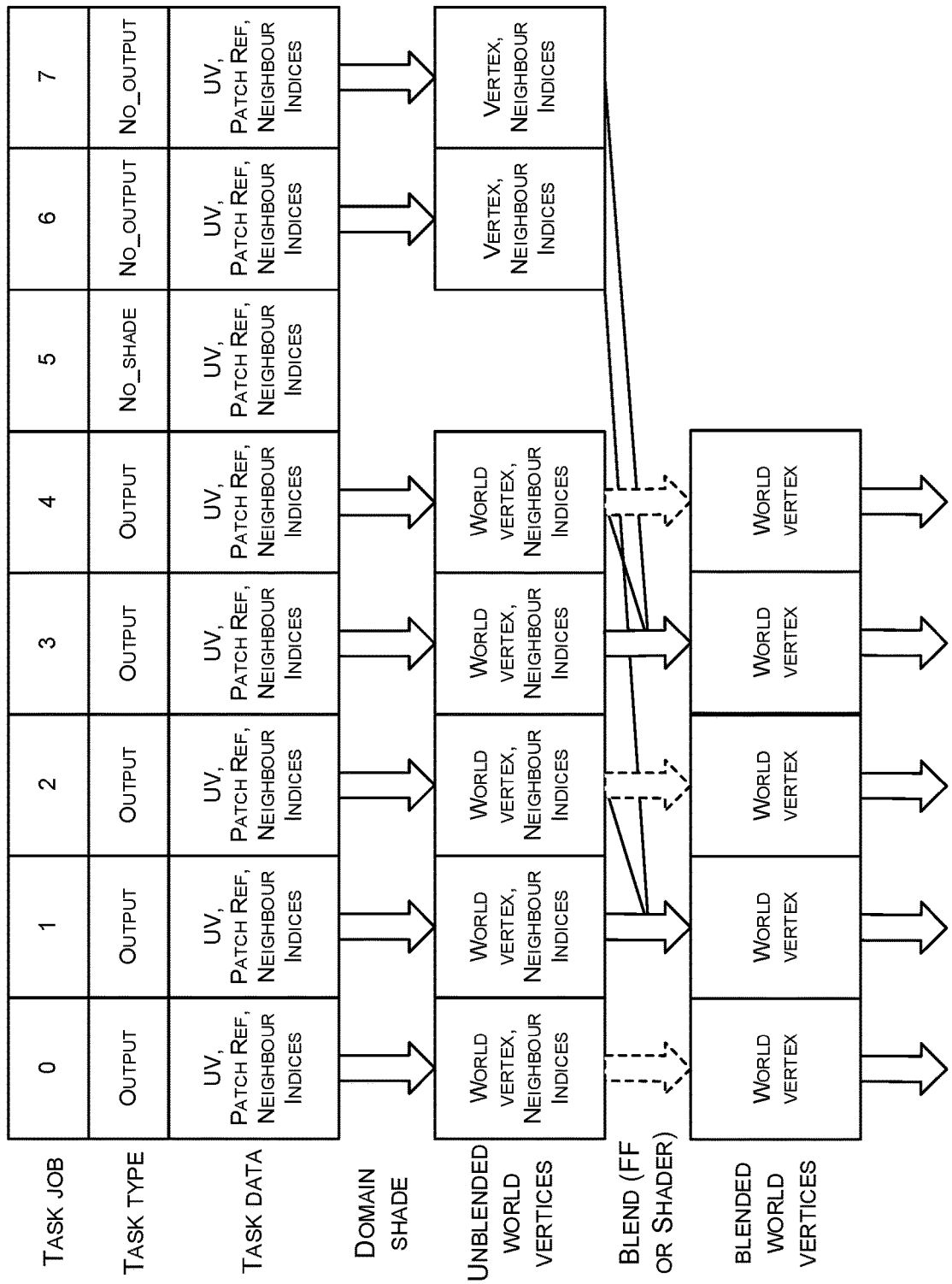
FIG. 8 is a schematic diagram showing the processing of tasks in the blender hardware of FIG. 4 or 7.

FIG. 8 is a schematic diagram showing stages of processing performed on flushed tasks and these tasks are all labelled with their task state, which may also be referred to as the task type. NO_SHADE jobs, such as job 5 in FIG. 8, undergo no processing as they do not contribute to the results of any vertex. NO_OUTPUT jobs, such as jobs 6 and 7, relate to vertices which are parents of other vertices in the task but are not themselves child vertices, and these are shaded and not blended but their results are used in the blending of other vertices (i.e. the relevant child vertices). OUTPUT jobs, such as 0, 1, 2, 3 and 4, are child vertices (and may also be parent vertices for other vertices in the task) and these are shaded, blended and sent to the Output Vertex Buffer 412 as now blended world vertices.

The Domain Shade stage (in domain shader 108) occurs in the same way as in any other Tessellation Scheme. A domain space UV and a set of domain Control Points (fetched using the Patch Reference) are used to generate all the world space attributes of the vertex e.g. position, normals and texture coordinates.

The blending operation (in blend unit 110) uses fixed function or programmable code that is executed for each job with permission to access to any of the post domain shader attributes of neighbours in order to modify results of that job, e.g. to interpolate between the current result and the average of the results of two neighbours. When the Blending stage is given as user programmable code, performing modifications on a subset of the world space attributes reduces the total operations. All vertices that are blended are output.

In scenarios where both the Domain Shader 108 and Blend Unit 110 are given as user programmable shader code, both stages may be performed as a single shader execution in a processor (e.g. the USC) with a barrier between the DS and Blender sections. All accesses to attributes of neighbour results occur after this barrier.

FIG. 8 shows how much processing is required for jobs of each state, however in various examples, in order to treat all jobs the same those with the NO_SHADE or NO_OUTPUT states can still be processed by the same Domain Shader and Blender code and Output to the Output Vertex Buffer even if the results are never referenced by an index. In this case, as described above, the counter 404 is updated to the next multiple of the Task size every time the Task is flushed and this is triggered by the task manager 408 sending a flush signal back to the CAM 402 (or counter 404).

Figure 9:
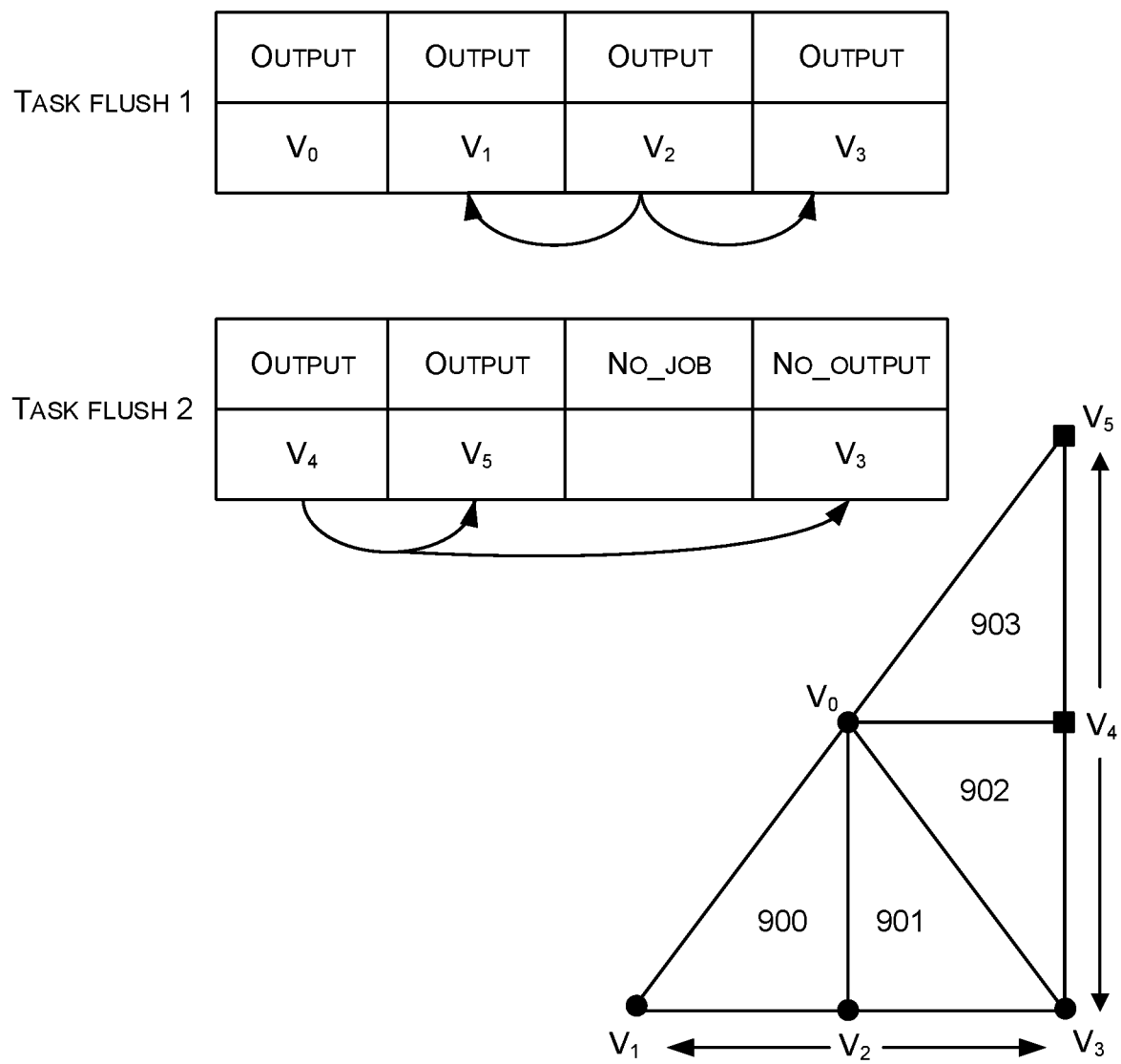
FIG. 9 is a graphical representation showing packing of vertices into tasks according to the method shown in FIG. 6.

FIG. 9 is a schematic diagram that illustrates the task packing operation that is performed by the task manager 408 in the blender hardware 400, 700. FIG. 9 shows an example set of four primitives 900-903 processed by the Task Manager 408 and in this example there is adjacency information provided for two vertices only, $v_2$ and $v_4$ (as indicated by the arrows in FIG. 9). In this example the Task Size is 4, and the CAM 402 has produced no duplication of vertices.

First, vertex $v_0$ is added to the task and it has no parents that need to be added. Similarly, $v_1$ can be added to the task on its own. The next vertex $v_2$ has two parents, $v_1$ and $v_3$. Vertex $v_1$ is already in the task but $v_3$ is not and so vertex $v_3$ is added to the task as a parent. The next vertex, $v_3$, from the CAM is already in the task. The next vertex, $v_4$, from the CAM cannot fit in the task (even without its parent vertices) and so the first task is flushed. In the first task, all jobs are marked OUTPUT as they correspond to corner vertices of a primitive and need to be output.

Vertex $v_4$, which could not fit into the first task, is added to the second task along with its parents $v_3$ and $v_5$. The next vertex, $v_5$, from the CAM is already in the task. There are no more vertices shown in FIG. 9; however, if the next vertex from the CAM has two parents, at least one of which is not already in the second task, then the new vertex cannot fit into the one available job slot and so the second task must be flushed and the vertex (and its parents) entered into the next task. In the second task, the only two entries that need to be passed to the Output Vertex Buffer are $v_4$ and $v_5$ and are thus marked OUTPUT. Vertex $v_3$ is in the Task only as a neighbour so is marked NO_OUTPUT and the empty job is marked NO_JOB. As $v_3$ is the parent of two vertices ($v_2$ and $v_4$) processed in different tasks, it must be included in both tasks and therefore is processed twice.

Figure 12:
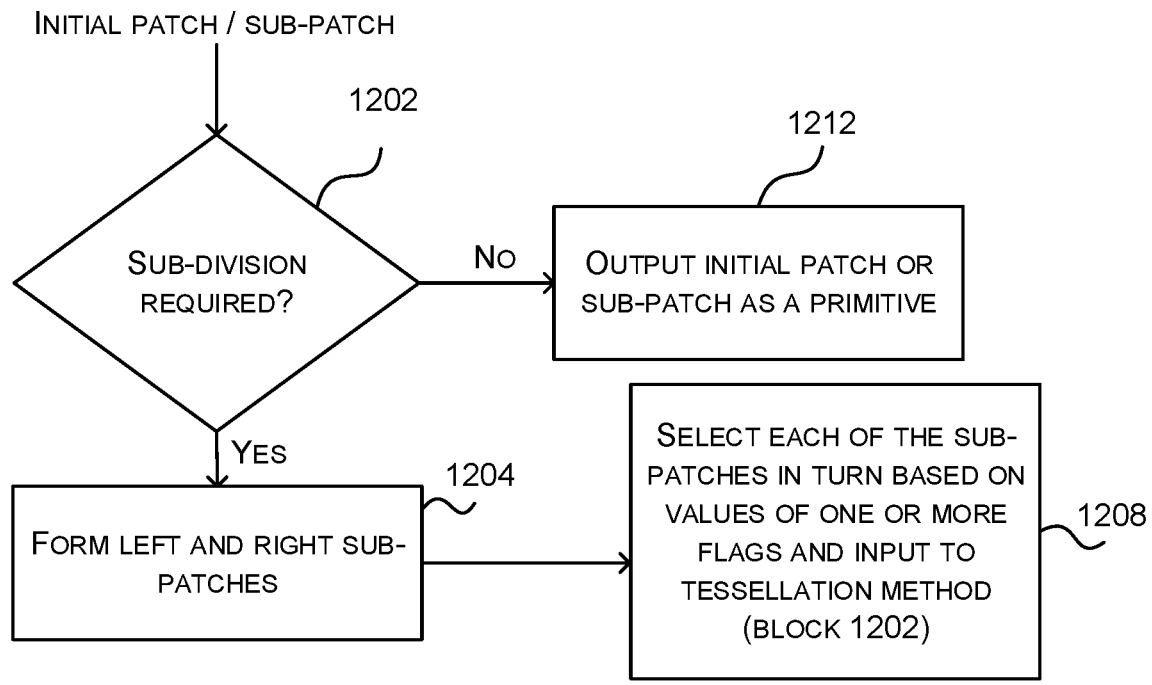
FIG. 12 is a flow diagram showing an example tessellation method that controls the order of primitive generation.

Although there are two ways in which a Task can fail to output a final vertex for each available job entry in the Task (e.g. because some vertices, such as $v_3$ in the example of FIG. 9, are included in more than one task and because not all the tasks are full, such as the second task in the example of FIG. 9), these situations occur relatively infrequently, for example at around an average of 1.5 entries per Task for the tessellation scheme shown in FIG. 12.

It will be appreciated that while FIG. 9 shows a task with 4 job slots, this is just one example task size. As the number of entries in a task is increased, the task efficiency also increases. For a task size of 32, 62 or 128 job slots, the efficiency is around 95% or more for the tessellation scheme shown in FIG. 12.

FIG. 12 is a flow diagram showing an example tessellation method that controls the order in which primitives are output by a tessellation unit (e.g. tessellation unit 104 in FIG. 1) and this method may be described with reference to the example patches shown in FIGS. 13A-13E. As described above, the method alternates the order that new patches are processed for each level of sub-division within the tessellation unit and as a consequence of this, adjacent primitives in the output ordering are guaranteed to be neighbouring primitives in UV space and thus share two vertices.

The method shown in FIG. 12 takes as an input, an initial patch (which may, in various examples, be an initial triangle patch) and FIG. 13A shows an example triangle initial patch 1302. As described above, a triangle patch is an ordered set of three vertices which bound a domain and in the examples described herein, this ordered set of vertices is written (T, L, R), where T, L and R refer to the top, left and right vertices respectively (as shown in FIG. 13A).

As shown in FIG. 12, an assessment is made to determine whether sub-division of the initial patch 1302 is required (block 1202). This determination may be made using any suitable tessellation method (e.g. any tessellation method that involves binary sub-division) and two examples which use vertex tessellation factors are described in GB2533443 and GB2533444.

If it is determined that the initial patch needs to be sub-divided ('Yes' in block 1202), then left and right sub-patches are formed (block 1204). This sub-division of the initial patch 1302 may comprise adding a mid-vertex (denoted M) on the edge between the left and right vertices (as shown in FIG. 13B) and in various examples the mid-vertex may be added at the mid-point between the left and right vertices. Both of these patches 1304L, 1304R which are formed (in block 1204) are triangle patches and comprise an ordered set of three vertices: (M, R, T) and (M, T, L), but in other examples they may be isolines or have more than three sides, and they may be referred to as the right sub-patch 1304R and the left sub-patch 1304L respectively.

One of the newly formed sub-patches (i.e. the left sub-patch 1304L or the right sub-patch 1304R formed in block 1204) is then selected (in block 1208) to be further tessellated ahead of the other of the newly formed sub-patches by inputting the selected sub-patch back into the method of FIG. 12. The order of selection of the left or right sub-patch (in block 1208) is made based on the values of one or more flags and two different examples of the use of flags are described below. In this way, the method of FIG. 12 is applied recursively at each level of sub-division of an initial patch with one branch of the sub-division tree being sub-divided fully, before assessing the other branch of the sub-division tree and with the order of selection at each branching point being determined by the one or more flags.

In a first example, there is a flag (e.g. a single bit flag) for each patch (e.g. for each initial patch and for each sub-patch which is subsequently formed by tessellation). This per-patch flag determines whether the left sub-patch or the right sub-patch is selected first and input back into the method of FIG. 12 (in block 1208) when that patch is sub-divided, i.e. when sub-dividing the initial patch (in block 1204), it is the flag associated with the initial patch that determines the selection made in the subsequent step (in block 1208). In such an example, this makes a triangle patch an ordered set of three vertices and a flag, e.g. (T,L,R,F) or (T,L,R,$\overline{F}$) where F and $\overline{F}$ represent the two different flag values (e.g. off and on, 1 and 0).

If the flag of the initial patch 1302 (which is being sub-divided in block 1204 as a consequence of the assessment in block 1202) has a first value of the flag (e.g. F) then the right sub-patch is selected and processed first (in block 1208) and the left sub-patch is input back into the method of FIG. 12 (i.e. tessellated as needed) only when no further sub-division of the right sub-patch is possible. If, however, the flag of the input patch 1302 has the other value (e.g. $\overline{F}$) then the left sub-patch is selected and processed first (in block 1208) and the right sub-patch is input back into the method of FIG. 12 (i.e. tessellated as needed) only when no further sub-division of the left sub-patch is possible. In such an example, when two sub-patches are generated by sub-division of a parent patch (in block 1204, where the parent patch may be the initial patch or a sub-patch formed from the initial patch), the value of the flag for both of the newly formed sub-patches is set to have the opposite value to the parent patch. Consequently, if the initial patch is (T,L,R,F) then the two sub-patches which are formed (in block 1204) are (M,T,L,$\overline{F}$) and (M,R,T,$\overline{F}$). Similarly, if the initial patch is (T,L,R,$\overline{F}$) then the two sub-patches which are formed (in block 204) are (M,T,L F) and (M, R, T, F).

In a second example, a single flag may be used in the tessellator which switches state every time the level of recursion decreases or increases by one. In this second example if the single flag has a first value (e.g. F) then the right sub-patch is selected and input back into the method of FIG. 12 first (in block 1208) and the left sub-patch is input back into the method of FIG. 12 (i.e. tessellated as needed) only when no further sub-division of the right sub-patch is possible. If, however, the single flag has the other value (e.g. $\overline{F}$) then the left sub-patch is selected and input back into the method of FIG. 12 first (in block 1208) and the right sub-patch is input back into the method of FIG. 12 (i.e. tessellated as needed) only when no further sub-division of the left sub-patch is possible. In this example, the swapping of the flag value may, for example, be performed following the decision to sub-divide (e.g. in response to a 'Yes' in block 1202) or following the formation of the two sub-patches (in block 1204).

As described above, having selected one of the two newly formed sub-patches 1304R, 1304L (in block 1208), the selected sub-patch is input back into the method of FIG. 12 and tessellated until no further sub-division is possible (in block 1208) and this is a recursive process. The selected newly formed sub-patch (e.g. sub-patch 1304R) becomes an input to the method of FIG. 12 and it is determined whether that patch should be sub-divided (in block 1202).

If no sub-division is required ('No' in block 1202), the selected newly formed sub-patch is output as a primitive (block 1212) and the non-selected newly formed sub-patch (e.g. patch 1304L) is input to the method of FIG. 12.

If, however, sub-division of the selected sub-patch (e.g. 1304R) is required ('Yes' in block 1202), left and right sub-patches (1306L, 1306R) are formed from the selected sub-patch (in block 1204). As the flags at this level of recursion have been swapped (either as a consequence of the flag in sub-patch 1304R being opposite to that in initial patch 1302 or because the single flag was swapped as part of the method of generating the sub-patches 1304R, 1304L), instead of selecting the right sub-patch 1306R first (as was the case at the immediately preceding level of recursion which resulted in the selection of sub-patch 1304R), the left sub-patch 1306L is selected first (in block 1208). If this selected sub-patch 1306L does not require any sub-division, it is output as a primitive (in block 1212) and the non-selected sub-patch 1306R is selected and assessed (in block 1202). Only when tessellation of both of these sub-patches 1306L, 1306R is complete, is the non-selected sub-patch 1304L from the top level of tessellation input back into the method of FIG. 12 and considered for sub-division (in block 1202).

The output primitive (from block 1212) takes the form of three indices in systems which use vertex indexing and three domain vertices where indexing is not used and where, as detailed above, a domain vertex may comprise only a UV coordinate or may comprise a UV coordinate plus other parameters (e.g. a weight and optionally the UV coordinates of one or more neighbouring vertices). In particular this weight may be a displacement factor and these neighbouring vertices may be two or three parent vertices as described in GB2533443 and GB2533444.

As shown in FIG. 13D, if the non-selected sub-patch 1304L requires sub-division ('Yes' in block 1202), two new sub-patches are formed, 1308L, 1308R. The flag used to make the selection (in block 1208) has the same value when making a selection between patches 1308L and 1308R as it did when making a selection between sub-patches 1306L and 1306R because both sub-divisions occur at the same level of recursion/tessellation and hence the left sub-patch 1308L is selected first. If this selected sub-patch 1308L does not require any sub-division, it is output as a triangle primitive (in block 1212) and the non-selected sub-patch 1308R is input to the method of FIG. 12 and assessed (in block 1202).

If using the method shown in FIG. 12, the initial patch 1302 is sub-divided into four sub-patches 1306L, 1306R, 1308L, 1308R, the sub-patches are generated and their primitives output in the following order: 1306L, 1306R, 1308L, 1308R and this ordering (with output primitives labelled 0-3 in order on the tessellated initial patch 1310) is shown in FIG. 13E.

Whilst the method of FIG. 12 involves use of a tessellation method that performs binary sub-division, the method of FIG. 12 may also be used where a patch is sub-divided into more than two sub-patches (in block 1204 e.g. into four sub-patches or X sub-patches, where X may often be a power of 2).

Whilst the methods and hardware are described herein with reference to post-tessellation domain shading, they are also applicable in other situations where there is a dependency relation (e.g. a parent-child relation as described below or other adjacency relation) between vertices that are being processed by the domain shader.

A further example provides blender hardware comprising: an input for receiving a domain space vertex, the domain space vertex comprising UV coordinates of the vertex, a blend weight of the vertex and where the UV coordinates of neighbour vertices are not inherent from the UV coordinates of the vertex itself, the UV coordinates of the neighbour vertices; a cache arranged to store data pairs, each data pair comprising a UV coordinate and a world space vertex generated from the UV coordinate by a domain shader; and a blend unit arranged to receive the blend weight of the input vertex, world space vertices for the input vertex and its neighbour vertices generated by a domain shader or accessed from the cache, and to generate a single world space vertex for the input vertex using the blend weight, wherein the cache is arranged to, in the event of a cache hit at a cache entry for a UV coordinate, output the world space vertex from the cache entry, and in the event of a cache miss for a UV coordinate, output the UV coordinate to a domain shader; and wherein the cache is arranged to receive and store world space vertices generated by the domain shader for input vertices and their neighbours.

A second further example provides a method of performing blending comprising: receiving a domain space vertex, the domain space vertex comprising UV coordinates of the vertex, a blend weight of the vertex and where the UV coordinates of neighbour vertices are not inherent from the UV coordinates of the vertex itself, the UV coordinates of the neighbour vertices; storing, in a cache, data pairs, each data pair comprising a UV coordinate and a world space vertex generated from the UV coordinate by a domain shader; in response to a cache hit at an entry in the cache, outputting the world space vertex from the cache entry; in response to a cache miss at an entry in the cache, outputting the UV coordinate to a domain shader and generating, in the domain shader, a world space vertex from the UV coordinate; and once world space vertices for the vertex and neighbour vertices have been output from the cache or the domain shader, generating, in a blend unit, a single world space vertex for the input vertex using the blend weight.

A third further example provides blender hardware comprising: an input for receiving a domain space vertex, the domain space vertex comprising UV coordinates of the vertex, a blend weight of the vertex and where the UV coordinates of neighbour vertices are not inherent from the UV coordinates of the vertex itself, the UV coordinates of the neighbour vertices; a content addressable memory arranged to store data tuples, each data tuple comprising a UV coordinate, a patch reference and an index; a counter arranged to be incremented when a data tuple is evicted from the content addressable memory; a blend unit arranged to receive the blend weight of the input vertex, world space vertices for the input vertex and its neighbour vertices generated in a single task by a domain shader, and to generate a single world space vertex for the input vertex; a task manager; an output index buffer; and an output vertex buffer, wherein the content addressable memory is arranged to, on receipt of an input vertex, to determine if the UV coordinate of the input vertex is stored in the content addressable memory and in response to the UV coordinate being stored in a data tuple in the content addressable memory, output the index from the data tuple to the output index buffer and in response to the UV coordinate not being stored in the content addressable memory, evict a data tuple from the content addressable memory, add the UV coordinate to a new data tuple with an index having a value equal to a value of the counter and output the index to the output index buffer and output the input vertex to the task manager, and wherein the task manager is arranged to receive input vertices from the content addressable memory, to pack UV coordinates for the input vertex and neighbour vertices of the input vertex into jobs within the same task and in response to determining that a task is full to output all the jobs in the task to the domain shader.

A fourth further example provides a method of performing blending comprising: receiving a domain space vertex, the domain space vertex comprising UV coordinates of the vertex, a blend weight of the vertex and where the UV coordinates of neighbour vertices are not inherent from the UV coordinates of the vertex itself, the UV coordinates of the neighbour vertices; storing data tuples in a content addressable memory, each data tuple comprising a UV coordinate, a patch reference and an index; on receipt of an input vertex, determining if the UV coordinate of the input vertex is stored in the content addressable memory; in response to the UV coordinate being stored in a data tuple in the content addressable memory, outputting the index from the data tuple to an output index buffer; in response to the UV coordinate not being stored in the content addressable memory: evicting a data tuple from the content addressable memory, adding the UV coordinate to a new data tuple with an index having a value equal to a value of the counter, outputting the index to the output index buffer; packing, by a task manager, UV coordinates for the input vertex and neighbour vertices of the input vertex into jobs within the same task; and in response to determining that a task is full, outputting all the jobs in the task to a domain shader and blend unit.

Figure 10:
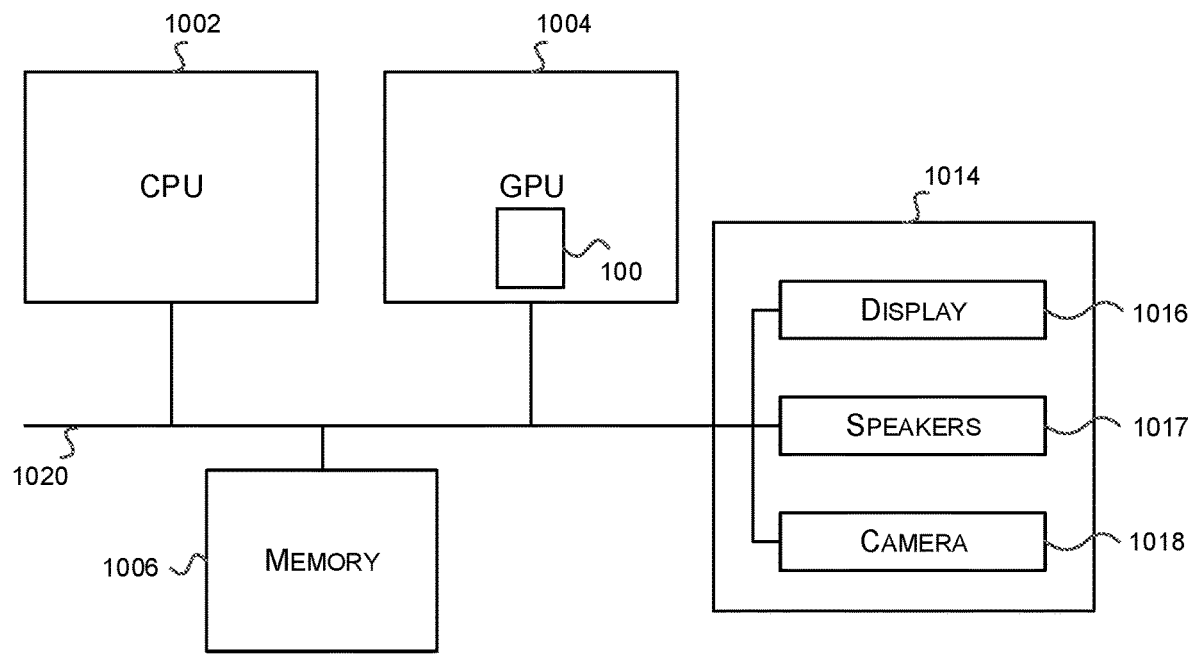
FIG. 10 shows a computer system in which a GPU pipeline is implemented.

FIG. 10 shows a computer system in which the GPU pipeline 100 described herein may be implemented. The computer system comprises a CPU 1002, a GPU 1004, a memory 1006 and other devices 1014, such as a display 1016, speakers 1017 and a camera 1018. The GPU 1004 comprises a GPU pipeline 100 as described herein. The components of the computer system can communicate with each other via a communications bus 1020.

The GPU pipeline 100 and blender hardware 200, 400, 700 of FIGS. 1, 2, 4 and 7 are shown as comprising a number of functional blocks. This is schematic only and is not intended to define a strict division between different logic elements of such entities. Each functional block may be provided in any suitable manner. It is to be understood that intermediate values described herein as being formed by a GPU pipeline or blender hardware need not be physically generated by the GPU pipeline or blender hardware at any point and may merely represent logical values which conveniently describe the processing performed by the GPU pipeline or blender hardware between its input and output.

The GPU pipeline or blender hardware described herein may be embodied in hardware on an integrated circuit. The GPU pipeline or blender hardware described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GPU pipeline or blender hardware configured to perform any of the methods described herein, or to manufacture a GPU pipeline or blender hardware comprising any apparatus described herein. An integrated circuit definition dataset may be, for example, an integrated circuit description.

Therefore, there may be provided a method of manufacturing, at an integrated circuit manufacturing system, a GPU pipeline or blender hardware as described herein. Furthermore, there may be provided an integrated circuit definition dataset that, when processed in an integrated circuit manufacturing system, causes the method of manufacturing a GPU pipeline or blender hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU pipeline or blender hardware will now be described with respect to FIG. 11.

Figure 11:
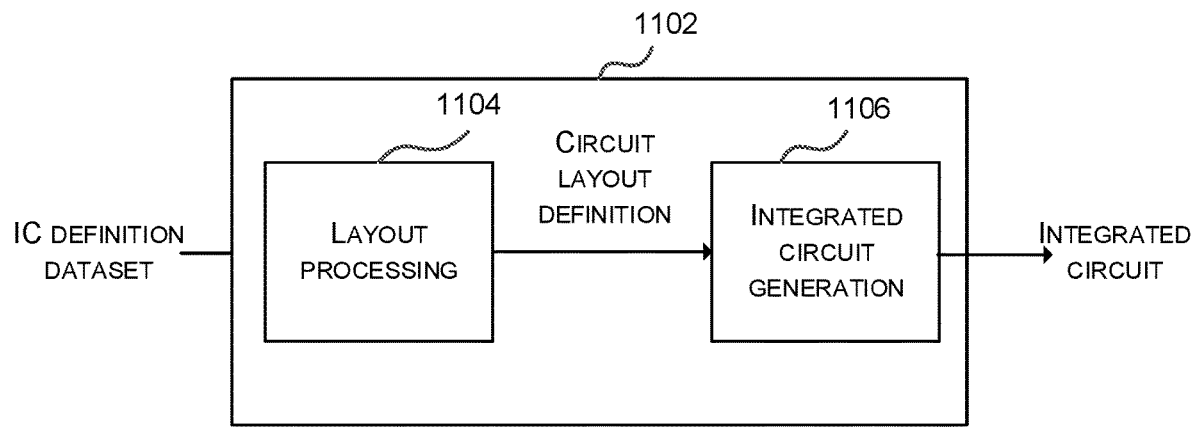
FIG. 11 shows an integrated circuit manufacturing system for generating an integrated circuit embodying a GPU pipeline.

FIG. 11 shows an example of an integrated circuit (IC) manufacturing system 1102 which is configured to manufacture a GPU pipeline or blender hardware as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a GPU pipeline or blender hardware as described in any of the examples herein), process the IC definition dataset, and generate an IC according to the IC definition dataset (e.g. which embodies a GPU pipeline or blender hardware as described in any of the examples herein). The processing of the IC definition dataset configures the IC manufacturing system 1102 to manufacture an integrated circuit embodying a GPU pipeline or blender hardware as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU pipeline or blender hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A GPU pipeline comprising a tessellation unit and post-tessellation blender hardware, wherein the blender hardware comprises:
    an input for receiving a domain space vertex output by the tessellation unit, the domain space vertex comprising:
        UV coordinates of the vertex,
        a blend weight of the vertex, and
        where UV coordinates of neighbour vertices are not inherent from the UV coordinates of the vertex itself, the UV coordinates of the neighbour vertices;
    a cache arranged to store data pairs, each data pair comprising a respective UV coordinate and a respective world space vertex generated from the respective UV coordinate by a domain shader; and
    a blend unit arranged to receive the blend weight of the domain space vertex, world space vertices for the domain space vertex and its neighbour vertices generated by a domain shader or accessed from the cache, and to generate a single world space vertex for the domain space vertex using the blend weight,
    wherein the cache is arranged to, in the event of a cache hit at a cache entry for a UV coordinate, output a world space vertex corresponding to the UV coordinate from the cache entry, and in the event of a cache miss for the UV coordinate, output the UV coordinate to a domain shader; and wherein the cache is arranged to receive and store world space vertices generated by the domain shader for input vertices and their neighbours.

2. The GPU pipeline according to claim 1, wherein the blender hardware further comprises:
a blend weight assessment logic block comprising hardware logic arranged to determine if the blend weight of the domain space vertex is equal to one and in response to determining that the blend weight of the domain space vertex is not equal to one, to output the UV coordinates of neighbours of the domain space vertex to the cache.

3. The GPU pipeline according to claim 2, wherein the blend weight assessment logic block is further arranged, in response to determining that the blend weight of the domain space vertex is equal to one, to output the UV coordinates of the vertex to the cache and wherein the cache is arranged to, in the event of a cache hit at a cache entry for any of the UV coordinates of a neighbour of the domain space vertex, output the world space vertex from the cache entry, and in the event of a cache miss for the UV coordinates of one or more of the neighbours of the domain space vertex, output the UV coordinates of the one or more neighbours to a domain shader.

4. The GPU pipeline according to claim 2, wherein the blend weight assessment logic block is further arranged, in response to determining that the blend weight of the domain space vertex is equal to one, to output the UV coordinates of the domain space vertex to a domain shader.

5. The GPU pipeline according to claim 1, wherein the blender hardware further comprises:
a vertex decompression hardware logic block arranged to generate the UV coordinates of the neighbour vertices from the domain space vertex and output the UV coordinates of the neighbour vertices to the cache;
a blend weight assessment logic block comprising hardware logic arranged to determine if the blend weight of the domain space vertex is equal to one, and in response to determining that the blend weight of the domain space vertex is not equal to one, to output the domain space vertex to the vertex decompression hardware logic block.

6. The GPU pipeline according to claim 1, wherein the cache is further arranged in response to receiving a new world space vertex from the domain shader when all entries in the cache are full, to evict a data pair from a selected entry in the cache and store the received world space vertex in the selected entry.

7. The GPU pipeline according to claim 6, wherein the cache is further arranged to select an oldest entry in the cache for eviction.

8. The GPU pipeline according to claim 6, wherein the cache is further arranged to select an entry in the cache for eviction comprising a UV coordinate that is furthest away in UV space from a UV coordinate corresponding to the received new world space vertex.

9. The GPU pipeline according to claim 1, wherein the blender hardware further comprises:
a domain shader arranged to receive surface patch data, perform a shading operation on any UV coordinate input to the domain shader to generate a world space vertex corresponding to the UV coordinate input and output the world space vertex corresponding to the UV coordinate input to the cache and to the blend unit.

10. The GPU pipeline according to claim 1, wherein the blend unit comprises:
a linear averaging hardware logic block comprising an input for receiving one or more world space vertices of neighbour vertices and hardware logic arranged to generate a linear average of all neighbour world space vertices using fixed weights; and
a hardware interpolation block comprising an input for receiving a world space vertex for the domain space vertex itself, a world space vertex output by the linear averaging hardware logic block and the blend weight and hardware logic arranged to perform a linear interpolation of the world space vertex for the domain space vertex itself and the world space vertex output by the linear averaging hardware logic block using the blend weight to generate the single world space vertex for the domain space vertex.

11. A method of performing post-tessellation blending comprising:
receiving a domain space vertex output by the tessellation unit, the domain space vertex comprising:
UV coordinates of the vertex,
a blend weight of the vertex, and
where UV coordinates of neighbour vertices are not inherent from the UV coordinates of the vertex itself, the UV coordinates of the neighbour vertices;
storing data pairs in a cache, each data pair comprising a respective UV coordinate and a respective world space vertex generated from the respective UV coordinate by a domain shader;
in response to a cache hit at an entry for a UV coordinate in the cache, outputting the world space vertex corresponding to the UV coordinate from the cache entry;
in response to a cache miss at an entry for the UV coordinate in the cache, outputting the UV coordinate to a domain shader and generating, in the domain shader, a world space vertex from the UV coordinate; and
once world space vertices for the vertex and neighbour vertices have been output from the cache or the domain shader, generating, in a blend unit, a single world space vertex for the domain space vertex using the blend weight.

12. The method according to claim 11, further comprising:
generating the UV coordinates of the neighbour vertices from the domain space vertex.

13. A GPU pipeline comprising a tessellation unit and post-tessellation blender hardware, wherein the blender hardware comprises:
an input for receiving a domain space vertex output by the tessellation unit, the domain space vertex comprising:
UV coordinates of the vertex,
a blend weight of the vertex, and
where UV coordinates of neighbour vertices are not inherent from the UV coordinates of the vertex itself, the UV coordinates of the neighbour vertices;
a content addressable memory arranged to store data tuples, each data tuple comprising a UV coordinate, a patch reference and an index;
a counter arranged to be incremented when a data tuple is evicted from the content addressable memory;
a blend unit arranged to receive the blend weight of the domain space vertex, world space vertices for the domain space vertex and its neighbour vertices generated in a single task by at least one domain shader, and to generate a single world space vertex for the domain space vertex;
a task manager;
an output index buffer; and
an output vertex buffer;
wherein the content addressable memory is arranged to, on receipt of the domain space vertex, to determine if the UV coordinate of the domain space vertex is stored in the content addressable memory and in response to the UV coordinate being stored in a data tuple in the content addressable memory, output the index from the data tuple to the output index buffer and in response to the UV coordinate not being stored in the content addressable memory, evict a data tuple from the content addressable memory, add the UV coordinate to a new data tuple with an index having a value equal to a value of the counter and output the index to the output index buffer and output the domain space vertex to the task manager, and
wherein the task manager is arranged to receive input vertices from the content addressable memory, to pack UV coordinates for the input domain space vertex and neighbour vertices of the domain space vertex into jobs within the same task and in response to determining that a task is full to output all the jobs in the task to the domain shader.

14. The GPU pipeline according to claim 13, further comprising:
at least one domain shader arranged to receive surface patch data and perform a shading operation on any UV coordinate input to the domain shader to generate a world space vertex.

15. The GPU pipeline according to claim 13, wherein the task manager is arranged to pack UV coordinates into jobs by:
placing UV coordinates for input vertices into jobs at a front end of a task;
placing UV coordinates for neighbour vertices into jobs at a back end of a task; and
in response to placing a UV coordinate for an input vertex into a job at the front end of a task, where the UV coordinate matches an already placed UV coordinate for a neighbour vertex, removing the job for the neighbour vertex.

16. The GPU pipeline according to claim 13, further comprising:
a vertex decompression hardware logic block arranged to generate the UV coordinates of the neighbour vertices from the domain space vertex and output the UV coordinates of the neighbour vertices to the content addressable memory.

17. The GPU pipeline according to claim 13, further comprising:
a converter logic block comprising hardware logic arranged to convert coordinates of the vertex from fixed-point to floating-point form prior to input to the task manager.

18. The GPU pipeline according to claim 13, further comprising:
an input index buffer, a CAM index buffer and a remapping logic block between the content addressable memory and the output index buffer, and wherein
the CAM index buffer is arranged to receive indices output by the content addressable memory and destined for the output index buffer, and
the remapping logic block comprises hardware logic arranged to assemble data input to the output index buffer by using indices stored in the input index buffer to reference the indices generated by the content addressable memory and stored in the CAM index buffer.

19. The GPU pipeline according to claim 13, further comprising one or more input buffers.

20. The GPU pipeline according to claim 13, wherein the blend unit comprises:
a linear averaging hardware logic block comprising an input for receiving one or more world space vertices of neighbour vertices and hardware logic arranged to generate a linear average of all neighbour world space vertices using fixed weights; and
a hardware interpolation block comprising an input for receiving one of the world space vertices for the domain space vertex itself, a world space vertex output by the linear averaging hardware logic block and the blend weight and hardware logic arranged to perform a linear interpolation of said one of the world space vertices for the domain space vertex itself and the world space vertex output by the linear averaging hardware logic block using the blend weight to generate the single world space vertex for the domain space vertex.

* * * * *